(12) United States Patent
Liu et al.

(10) Patent No.: US 12,715,455 B2
(45) Date of Patent: Aug. 25, 2026

(54) VEHICLE STATUS PARAMETER ESTIMATION METHOD AND APPARATUS

(71) Applicant: Yinwang Intelligent Technologies Co., Ltd., Shenzhen (CN)

(72) Inventors: Donghao Liu, Shanghai (CN); Jie Luo, Shanghai (CN); Yongsheng Zhang, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 55 days.

(21) Appl. No.: 18/600,374

(22) Filed: Mar. 8, 2024

(65) Prior Publication Data

US 2024/0208516 A1 Jun. 27, 2024

Related U.S. Application Data

(63) Continuation of application No. PCT/CN2021/117746, filed on Sep. 10, 2021.

(51) Int. Cl.
*B60W 50/02* (2012.01)
*G06N 3/02* (2006.01)

(52) U.S. Cl.
CPC ........... *B60W 50/0205* (2013.01); *G06N 3/02* (2013.01); *B60W 2050/021* (2013.01); *B60W 2050/0215* (2013.01); *B60W 2520/105* (2013.01); *B60W 2520/125* (2013.01); *B60W 2520/14* (2013.01); *B60W 2520/20* (2013.01); *B60W 2520/28* (2013.01)

(58) Field of Classification Search
CPC ....... B60W 50/0205; B60W 2050/021; B60W 2050/0215; B60W 2520/105; B60W 2520/125; B60W 2520/14; B60W 2520/20; B60W 2520/28; G06N 3/02
See application file for complete search history.

(56) References Cited

U.S. PATENT DOCUMENTS

| | | | |
|---|---|---|---|
| 5,094,213 A | 3/1992 | Dudek et al. | |
| 2017/0169627 A1* | 6/2017 | Kim | G01S 13/862 |
| 2024/0208516 A1* | 6/2024 | Liu | B60T 8/172 |

FOREIGN PATENT DOCUMENTS

| | | |
|---|---|---|
| CN | 104417565 A | 3/2015 |
| CN | 105549003 A | 5/2016 |
| CN | 106515740 A | 3/2017 |

(Continued)

*Primary Examiner* — James J Lee
(74) *Attorney, Agent, or Firm* — Leydig, Voit & Mayer, Ltd.

(57) ABSTRACT

This application provides a vehicle status parameter estimation method and an apparatus, and relates to the field of automotive control technologies. The method includes: obtaining driving status data of a vehicle, a first process status x, and a first process covariance Q; determining a second process covariance Q(k) and a first measurement covariance R(k) based on the driving status data of the vehicle; obtaining a first measurement value $y_h$ of a vehicle sensor; and determining a vehicle status parameter of the vehicle based on the first measurement value $y_h$, the first process status x, the first process covariance Q, the second process covariance Q(k), and the first measurement covariance R(k).

21 Claims, 9 Drawing Sheets

(56) References Cited

FOREIGN PATENT DOCUMENTS

| | | | |
|---|---|---|---|
| CN | 107031654 | A | 8/2017 |
| CN | 108357498 | A | 8/2018 |
| CN | 111152795 | A | 5/2020 |
| CN | 112417598 | A | 2/2021 |
| CN | 112665593 | A | 4/2021 |
| DE | 102016214064 | A1 | 2/2018 |

* cited by examiner

VEHICLE STATUS PARAMETER ESTIMATION METHOD AND APPARATUS

CROSS-REFERENCE TO RELATED APPLICATIONS

This application is a continuation of International Application No. PCT/CN2021/117746, filed on Sep. 10, 2021, the disclosure of which is hereby incorporated by reference in its entirety.

TECHNICAL FIELD

This application relates to the field of automotive control technologies, and in particular, to a vehicle status parameter estimation method and apparatus.

BACKGROUND

In recent years, with development of intelligent automobiles, vehicle control systems including an electronic stability program (ESP), an antilock brake system (ABS), and a traction control system (TCS) have been more widely used in vehicles. Currently, to implement automatic control on the vehicles, various types of vehicle status data usually need to be collected to invoke the various vehicle control systems. Generally, various sensors may be installed on the vehicles, to collect the vehicle status data. However, some vehicle status data including a centroid sideslip angle usually needs to be measured by installing additional expensive sensors. Considering that manufacturing costs of mass production vehicles need to be controlled, people increasingly tend to obtain, through estimation by using signals collected by existing vehicle-mounted sensors on the vehicles, other parameters used for vehicle control, such as a centroid sideslip angle, a yaw angular velocity, and a longitudinal vehicle speed. However, a vehicle status parameter estimation method proposed in a current conventional technology has relatively low precision, and cannot satisfy a high-precision requirement for vehicle control.

SUMMARY

This application provides a vehicle status parameter estimation method and a vehicle status parameter estimation apparatus, to improve estimation precision of a vehicle status parameter.

According to a first aspect, this application provides a vehicle status parameter estimation method. The method includes:

- obtaining driving status data of a vehicle, a first process status x, and a first process covariance Q;
- determining a second process covariance Q(k) and a first measurement covariance R(k) based on the driving status data of the vehicle;
- obtaining a first measurement value $y_h$ of a vehicle sensor; and
- determining a vehicle status parameter of the vehicle based on the first measurement value $y_h$, the first process status x, the first process covariance Q, the second process covariance Q(k), and the first measurement covariance R(k).

In this application, in a process of estimating the vehicle status parameter, the process covariance and the measurement covariance are adaptively adjusted based on the driving status data, and then an adjusted process covariance and measurement covariance are used for a vehicle status estimation, so that estimation precision of the vehicle status parameter can be improved.

In a possible implementation, the driving status data includes one or more of the following: a lateral acceleration change rate $\dot{r}V$, a steering wheel speed $\dot{\delta}$, a horizontal acceleration $a_y$, a road adhesion coefficient $\mu$, a front left wheel speed $\omega_{FL}$, a front right wheel speed $\omega_{FR}$, a rear left wheel speed $\omega_{RL}$, or a rear right wheel speed $\omega_{RR}$.

In a possible implementation, the determining a second process covariance Q(k) based on the driving status data of the vehicle includes:

- when the road adhesion coefficient $\mu$ is greater than or equal to a first preset road adhesion coefficient threshold $\mu_{TH}$, and an absolute value $|rV|$ of the lateral acceleration change rate is greater than a preset lateral acceleration change rate threshold $\dot{r}V_{TH}$ and/or an absolute value $|\dot{\delta}|$ of the steering wheel speed is greater than a preset steering wheel speed threshold $\dot{\delta}_{TH}$, obtaining a first preset process covariance matrix as the second process covariance Q(k); or
- when the road adhesion coefficient $\mu$ is greater than or equal to the first preset road adhesion coefficient threshold $\mu_{TH}$, and the absolute value $|rV|$ of the lateral acceleration change rate is less than or equal to the preset lateral acceleration change rate threshold $\dot{r}V_{TH}$ and the absolute value $|\dot{\delta}|$ of the steering wheel speed is less than or equal to the preset steering wheel speed threshold $\dot{\delta}_{TH}$, determining the second process covariance Q(k) based on the horizontal acceleration $a_y$; or
- when the road adhesion coefficient $\mu$ is less than the first preset road adhesion coefficient threshold $\mu_{TH}$, and the absolute value $|rV|$ of the lateral acceleration change rate is greater than the preset lateral acceleration change rate threshold $\dot{r}V_{TH}$ and/or the absolute value $|\dot{\delta}|$ of the steering wheel speed is greater than the preset steering wheel speed threshold $\dot{\delta}_{TH}$, obtaining a second preset process covariance matrix as the second process covariance Q(k); or
- when the road adhesion coefficient $\mu$ is less than the first preset road adhesion coefficient threshold $\mu_{TH}$, and the absolute value $|rV|$ of the lateral acceleration change rate is less than or equal to the preset lateral acceleration change rate threshold $\dot{r}V_{TH}$ and the absolute value $|\dot{\delta}|$ of the steering wheel speed is less than or equal to the preset steering wheel speed threshold $\dot{\delta}_{TH}$, obtaining a third preset process covariance matrix as the second process covariance Q(k).

In a possible implementation, the determining a first measurement covariance R(k) based on the driving status data of the vehicle includes:

- when a maximum value $\max|\Delta\omega_i|$ of an absolute value of a wheel speed difference between different wheels is greater than a preset wheel speed difference threshold $\Delta\omega_{TH}$, and/or a minimum value $\min|\omega_i|$ of absolute values of wheel speeds of different wheels is less than a preset wheel speed threshold $\omega_{TH}$, obtaining a first preset measurement covariance matrix as the first measurement covariance R(k); or
- when the maximum value $\max|\Delta\omega_i|$ of the absolute value of the wheel speed difference between the different wheels is less than or equal to the preset wheel speed difference threshold $\Delta\omega_{TH}$, and the minimum value $\min|\omega_i|$ of the absolute values of the wheel speeds of the different wheels is greater than or equal to the preset wheel speed threshold $\omega_{TH}$, determining the first measurement covariance R(k) based on the road adhesion coefficient μ.

In a possible implementation, the determining the first measurement covariance R(k) based on the road adhesion coefficient μ includes:

when the road adhesion coefficient μ is greater than or equal to a second preset road adhesion coefficient threshold $$\mu'_{TH},$$

obtaining a second preset measurement covariance matrix as the first measurement covariance R(k); or when the road adhesion coefficient μ is less than the second preset road adhesion coefficient threshold $$\mu'_{TH},$$

obtaining a third preset measurement covariance matrix as the first measurement covariance R(k).

In a possible implementation, the first measurement value $y_h$ of the vehicle sensor includes a measurement value measured by a real vehicle sensor and a measurement value obtained based on a virtual vehicle sensor, and the measurement value of the virtual vehicle sensor is obtained by using a neural network.

In this application, a result obtained by introducing another estimation method (for example, a kinematics-based status estimation, a neural network-based status estimation, and a vision-based status estimation) is used as the measurement value of the "virtual sensor", the measurement value obtained through measurement of the real sensor and the calculated measurement covariance are extended, and the extended measurement value and measurement covariance are used for the vehicle status estimation. This can further improve the estimation precision of the vehicle status parameter.

In a possible implementation, the first process status x includes one or more of the following:

a longitudinal speed $v_x$, a horizontal speed $v_y$, a yaw angular velocity r, the front left wheel speed $\omega_{FL}$, the front right wheel speed $\omega_{FR}$, the rear left wheel speed $\omega_{RL}$, the rear right wheel speed $\omega_{RR}$, or the road adhesion coefficient μ.

In a possible implementation, the first measurement value $y_h$ includes one or more of the following:

a longitudinal acceleration $a_x$, the horizontal acceleration $a_y$, the yaw angular velocity r, the front left wheel speed $\omega_{FL}$, the front right wheel speed $\omega_{FR}$, the rear left wheel speed $\omega_{RL}$, the rear right wheel speed $\omega_{RR}$, or a centroid sideslip angle β.

In a possible implementation, the vehicle status parameter includes one or more of the following:

the longitudinal speed $v_x$, the horizontal speed $v_y$, the yaw angular velocity r, the front left wheel speed $\omega_{FL}$, the front right wheel speed $\omega_{FR}$, the rear left wheel speed $\omega_{RL}$, the rear right wheel speed $\omega_{RR}$, the road adhesion coefficient μ, the longitudinal acceleration $a_x$, the horizontal acceleration $a_y$, or the centroid sideslip angle β.

According to a second aspect, this application provides a vehicle status parameter estimation apparatus. The apparatus includes:

a transceiver unit, configured to obtain driving status data of a vehicle, a first process status x, and a first process covariance Q; and a processing unit, configured to determine a second process covariance Q(k) and a first measurement covariance R(k) based on the driving status data of the vehicle.

The transceiver unit is configured to obtain a first measurement value $y_h$ of a vehicle sensor.

The processing unit is configured to determine a vehicle status parameter of the vehicle based on the first measurement value $y_h$, the first process status x, the first process covariance Q, the second process covariance Q(k), and the first measurement covariance R(k).

In a possible implementation, the driving status data includes one or more of the following: a lateral acceleration change rate $\dot{r}V$, a steering wheel speed $\dot{\delta}$, a horizontal acceleration $a_y$, a road adhesion coefficient μ, a front left wheel speed $\omega_{FL}$, a front right wheel speed $\omega_{FR}$, a rear left wheel speed $\omega_{RL}$, or a rear right wheel speed $\omega_{RR}$.

In a possible implementation, the processing unit is configured to:

when the road adhesion coefficient μ is greater than or equal to a first preset road adhesion coefficient threshold $\mu_{TH}$, and an absolute value $|\dot{r}V|$ of the lateral acceleration change rate is greater than a preset lateral acceleration change rate threshold $\dot{r}V_{TH}$ and/or an absolute value $|\dot{\delta}|$ of the steering wheel speed is greater than a preset steering wheel speed threshold $\dot{\delta}_{TH}$, obtain a first preset process covariance matrix as the second process covariance Q(k); or when the road adhesion coefficient μ is greater than or equal to the first preset road adhesion coefficient threshold $\mu_{TH}$, and the absolute value $|\dot{r}V|$ of the lateral acceleration change rate is less than or equal to the preset lateral acceleration change rate threshold $\dot{r}V_{TH}$ and the absolute value $|\dot{\delta}|$ of the steering wheel speed is less than or equal to the preset steering wheel speed threshold $\dot{\delta}_{TH}$, determine the second process covariance Q(k) based on the horizontal acceleration $a_y$; or when the road adhesion coefficient μ is less than the first preset road adhesion coefficient threshold $\mu_{TH}$, and the absolute value $|\dot{r}V|$ of the lateral acceleration change rate is greater than the preset lateral acceleration change rate threshold $\dot{r}V_{TH}$ and/or the absolute value $|\dot{\delta}|$ of the steering wheel speed is greater than the preset steering wheel speed threshold $\dot{\delta}_{TH}$, obtain a second preset process covariance matrix as the second process covariance Q(k); or when the road adhesion coefficient μ is less than the first preset road adhesion coefficient threshold $\mu_{TH}$, and the absolute value $|\dot{r}V|$ of the lateral acceleration change rate is less than or equal to the preset lateral acceleration change rate threshold $\dot{r}V_{TH}$ and the absolute value $|\dot{\delta}|$ of the steering wheel speed is less than or equal to the preset steering wheel speed threshold $\dot{\delta}_{TH}$, obtain a third preset process covariance matrix as the second process covariance Q(k).

In a possible implementation, the processing unit is configured to:

when a maximum value $\max|\Delta\omega_i|$ of an absolute value of a wheel speed difference between different wheels is greater than a preset wheel speed difference threshold $\Delta\omega_{TH}$, and/or a minimum value $\min|\omega_i|$ of absolute values of wheel speeds of different wheels is less than a preset wheel speed threshold $\omega_{TH}$, obtain a first preset measurement covariance matrix as the first measurement covariance R(k); or when the maximum value $\max|\Delta\omega_i|$ of the absolute value of the wheel speed difference between the different wheels is less than or equal to the preset wheel speed difference threshold $\Delta\omega_{TH}$, and the minimum value $\min|\omega_i|$ of the absolute values of the wheel speeds of the different wheels is greater than or equal to the preset wheel speed threshold $\omega_{TH}$, determine the first measurement covariance R(k) based on the road adhesion coefficient $\mu$.

In a possible implementation, the processing unit is configured to:

when the road adhesion coefficient $\mu$ is greater than or equal to a second preset road adhesion coefficient threshold $$\mu'_{TH},$$

obtain a second preset measurement covariance matrix as the first measurement covariance R(k); or when the road adhesion coefficient $\mu$ is less than the second preset road adhesion coefficient threshold $$\mu'_{TH},$$

obtain a third preset measurement covariance matrix as the first measurement covariance R(k).

In a possible implementation, the first measurement value $y_h$ of the vehicle sensor includes a measurement value measured by a real vehicle sensor and a measurement value obtained based on a virtual vehicle sensor, and the measurement value of the virtual vehicle sensor is obtained by using a neural network.

In a possible implementation, the first process status x includes one or more of the following:

a longitudinal speed $v_x$, a horizontal speed $v_y$, a yaw angular velocity r, the front left wheel speed $\omega_{FL}$, the front right wheel speed $\omega_{FR}$, the rear left wheel speed $\omega_{RL}$, the rear right wheel speed $\omega_{RR}$, or the road adhesion coefficient $\mu$.

In a possible implementation, the first measurement value $y_h$ includes one or more of the following:

a longitudinal acceleration $a_x$, the horizontal acceleration $a_y$, the yaw angular velocity r, the front left wheel speed $\omega_{FL}$, the front right wheel speed $\omega_{FR}$, the rear left wheel speed $\omega_{RL}$, the rear right wheel speed $\omega_{RR}$, or a centroid sideslip angle $\beta$.

In a possible implementation, the vehicle status parameter includes one or more of the following:

the longitudinal speed $v_x$, the horizontal speed $v_y$, the yaw angular velocity r, the front left wheel speed $\omega_{FL}$, the front right wheel speed $\omega_{FR}$, the rear left wheel speed $\omega_{RL}$, the rear right wheel speed $\omega_{RR}$, the road adhesion coefficient $\mu$, the longitudinal acceleration $a_x$, the horizontal acceleration $a_y$, or the centroid sideslip angle $\beta$.

According to a third aspect, this application provides a vehicle status parameter estimation apparatus. The apparatus may be a terminal device, an apparatus in a terminal device, or an apparatus that can work together with a terminal device. Alternatively, the vehicle status parameter estimation apparatus may be a chip system. The vehicle status parameter estimation apparatus may perform the method described in the first aspect. A function of the vehicle status parameter estimation apparatus may be implemented by hardware, or may be implemented by hardware executing corresponding software. The hardware or the software includes one or more units or modules corresponding to the foregoing function. The unit or module may be software and/or hardware. For operations performed by the vehicle status parameter estimation apparatus and beneficial effects, refer to the method and beneficial effects in the first aspect. Details are not described again.

According to a fourth aspect, this application provides a vehicle status parameter estimation apparatus. The apparatus may be a terminal device. The vehicle status parameter estimation apparatus includes a processor and a transceiver. The processor and the transceiver are configured to execute a computer program or instructions stored in at least one memory, to enable the apparatus to perform the method according to any implementation of the first aspect.

According to a fifth aspect, this application provides a vehicle status parameter estimation apparatus. The apparatus may be a terminal device, and the vehicle status parameter estimation apparatus includes a processor, a transceiver, and a memory. The processor, the transceiver, and the memory are coupled. The processor and the transceiver are configured to perform the method according to any implementation of the first aspect.

According to a sixth aspect, this application provides a computer-readable storage medium, where the storage medium stores a computer program or instructions, and when the computer program or the instructions are executed by a computer, the method according to any implementation of the first aspect is performed.

According to a seventh aspect, this application provides a computer program product including instructions. The computer program product includes computer program code, and when the computer program code is run on a computer, the method according to any implementation of the first aspect is performed.

According to an eighth aspect, a chip system is provided. The chip system includes a processor, and may further include a memory, and is configured to perform the method according to any aspect and any possible design of the first aspect. The chip system may include a chip, or include a chip and another discrete device.

DESCRIPTION OF EMBODIMENTS

Figure 1:
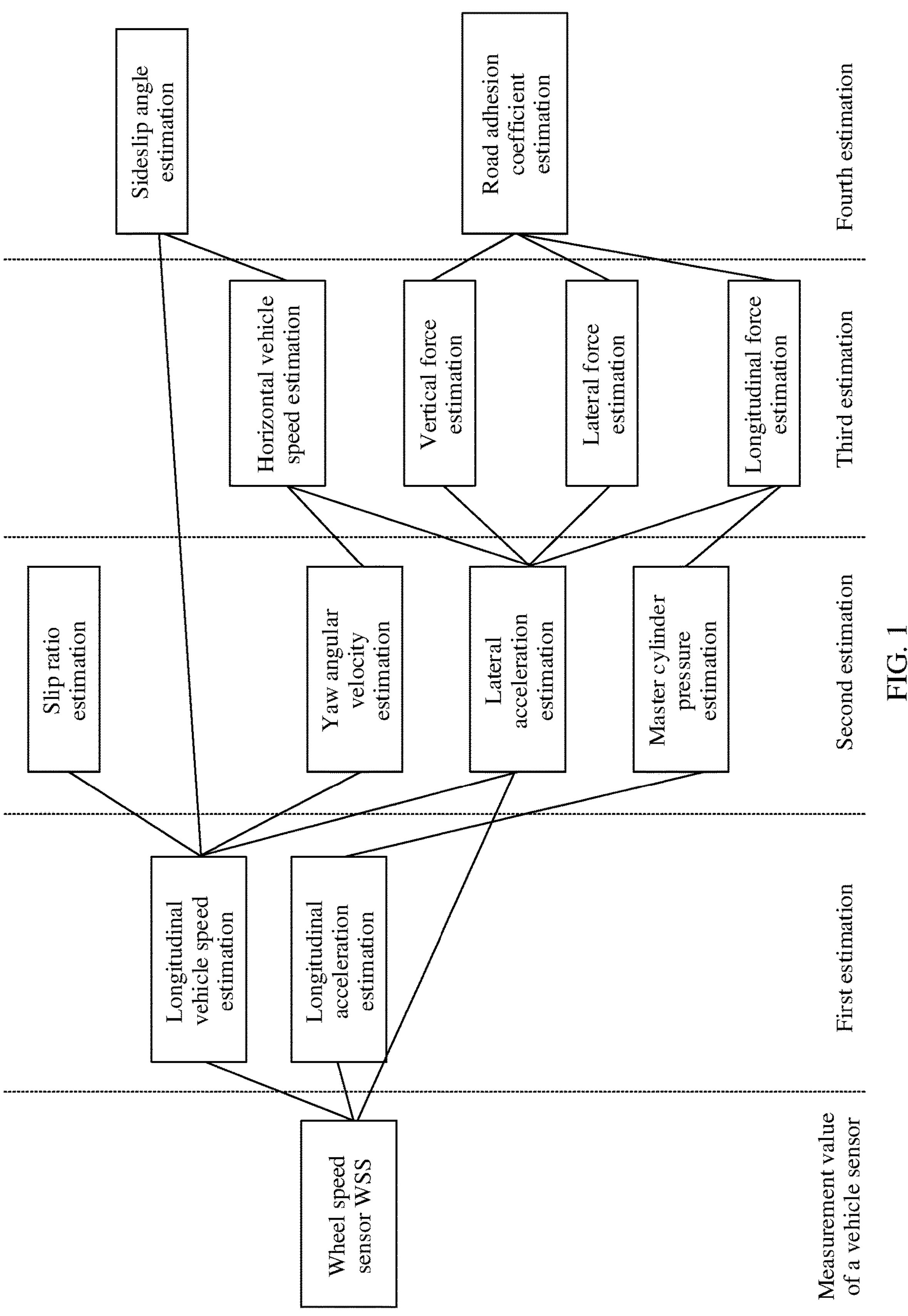
FIG. 1 is a schematic diagram of a vehicle status estimation based on a wheel speed sensor according to an embodiment of this application.

The following describes the technical solutions in embodiments of this application with reference to the accompanying drawings in embodiments of this application.

In descriptions of this application, unless otherwise specified, "/" means "or". For example, A/B may indicate A or B. The term "and/or" in embodiments of this application describes only an association relationship for describing associated objects and represents that three relationships may exist. For example, A and/or B may represent the following three cases: Only A exists, both A and B exist, and only B exists. In addition, "at least one" means one or more, and "a plurality of" means two or more. The terms such as "first" and "second" do not limit a quantity and an execution sequence, and the terms such as "first" and "second" do not indicate a definite difference.

In this application, the term "example" or "for example" is used to represent giving an example, an illustration, or a description. Any embodiment or design scheme described as an "example" or "for example" in this application should not be explained as being more preferred or having more advantages than another embodiment or design scheme. To be precise, the word such as "example" or "for example" is intended to present a related concept in a specific manner.

For ease of understanding, the following first explains some terms in embodiments of this application.

1. Unscented Kalman filter (UKF): The UKF is another idea of resolving a nonlinear Kalman filter, where unscented transformation is used to resolve a problem of nonlinear transformation of probability distribution. The unscented Kalman filter does not need to calculate a Jacobian matrix like an extended Kalman filter, and can obtain a more accurate nonlinear processing effect when a calculation amount is roughly the same.
2. Inertial measurement unit (IMU): The IMU is an apparatus for measuring a three-axis attitude angle and an acceleration of an object, and usually includes three single-axis accelerometers and three single-axis gyroscopes.
3. Steering angle sensor (SAS): The SAS is used to measure a rotation angle of a steering wheel during vehicle steering, and mainly installed in a steering wheel column under the steering wheel.
4. Wheel speed sensor (WSS): The WSS is a sensor used to measure a speed of an automotive wheel. A commonly used wheel speed sensor mainly includes a magnetoelectric wheel speed sensor and a Hall wheel speed sensor.
5. Master cylinder pressure sensor (MPS): The MPS is a sensor used to measure a pressure in a master cylinder.
6. Advanced driver assistance system (ADAS): In a vehicle driving process, various sensors (a millimeter wave radar, a lidar, a camera, and a satellite navigator) mounted in a vehicle are used to sense an ambient environment at any time, collect data, identify, detect and track static and dynamic objects, and perform systematic calculation and analysis based on navigation map data, so that a driver can detect possible danger in advance, and comfort and safety of automotive driving are effectively improved.

The following describes a system architecture and a service scenario in embodiments of this application. It should be noted that the system architecture and the service scenario described in this application are intended to describe the technical solutions in this application, and do not constitute a limitation on the technical solutions provided in this application. Persons of ordinary skill in the art may know that with evolution of the system architecture and emergence of new service scenarios, the technical solutions provided in this application are also applicable to similar technical problems.

It should be noted that a high-precision vehicle status parameter estimation (briefly referred to as a vehicle status estimation) is an important prerequisite for vehicle dynamics control and autonomous driving motion control. With popularization of the ADAS and artificial intelligence (AI) technologies, sensors such as a vision sensor, an inertial navigation sensor, a radar, a lidar, and the like are more used in the vehicle, Therefore, new opportunities are provided for the vehicle status estimation. An increasing quantity of sensors can usually reduce a quantity of vehicle status estimations, such as a centroid sideslip angle estimation, and a road adhesion coefficient estimation. For example. FIG. 1 is a schematic diagram of a vehicle status estimation based on a wheel speed sensor according to an embodiment of this application. As shown in FIG. 1, when only a wheel speed sensor (WSS) is available, a centroid sideslip angle and a road adhesion coefficient of a vehicle need to be indirectly obtained through four estimations, and because a specific estimation error is introduced in each estimation, estimation precision decreases with each estimation, Specifically, parameters such as a front left wheel speed, a front right wheel speed, a rear left wheel speed, and a rear right wheel speed of the vehicle may be obtained through measurement based on the WSS, and are respectively denoted as $\omega_{FL}$, $\omega_{FR}$, $\omega_{RL}$, and $\omega_{RR}$. The parameters are briefly referred to as WSS measurement values for ease of description. In a first estimation, a longitudinal vehicle speed, a longitudinal acceleration, and the like may be obtained through estimation based on the WSS measurement values. In a second estimation, a slip ratio and a yaw angular velocity may be obtained through estimation based on the longitudinal vehicle speed, a lateral acceleration may be obtained through estimation based on the longitudinal vehicle speed and the WSS measurement values, and a master cylinder pressure value and the like may be obtained through estimation based on the longitudinal acceleration. In a third estimation, a horizontal vehicle speed is obtained through estimation based on the yaw angular velocity and the lateral acceleration, a vertical force and a lateral force are separately obtained through estimation based on the lateral acceleration, and a longitudinal force and the like are obtained through estimation based on the lateral acceleration and the master cylinder pressure value. In a fourth estimation, a sideslip angle is obtained through estimation based on the longitudinal vehicle speed obtained in the first estimation and the horizontal vehicle speed obtained in the third estimation, and a road adhesion coefficient and the like are obtained through estimation based on the vertical force, the lateral force, and the longitudinal force obtained in the third estimation.

Figure 2:
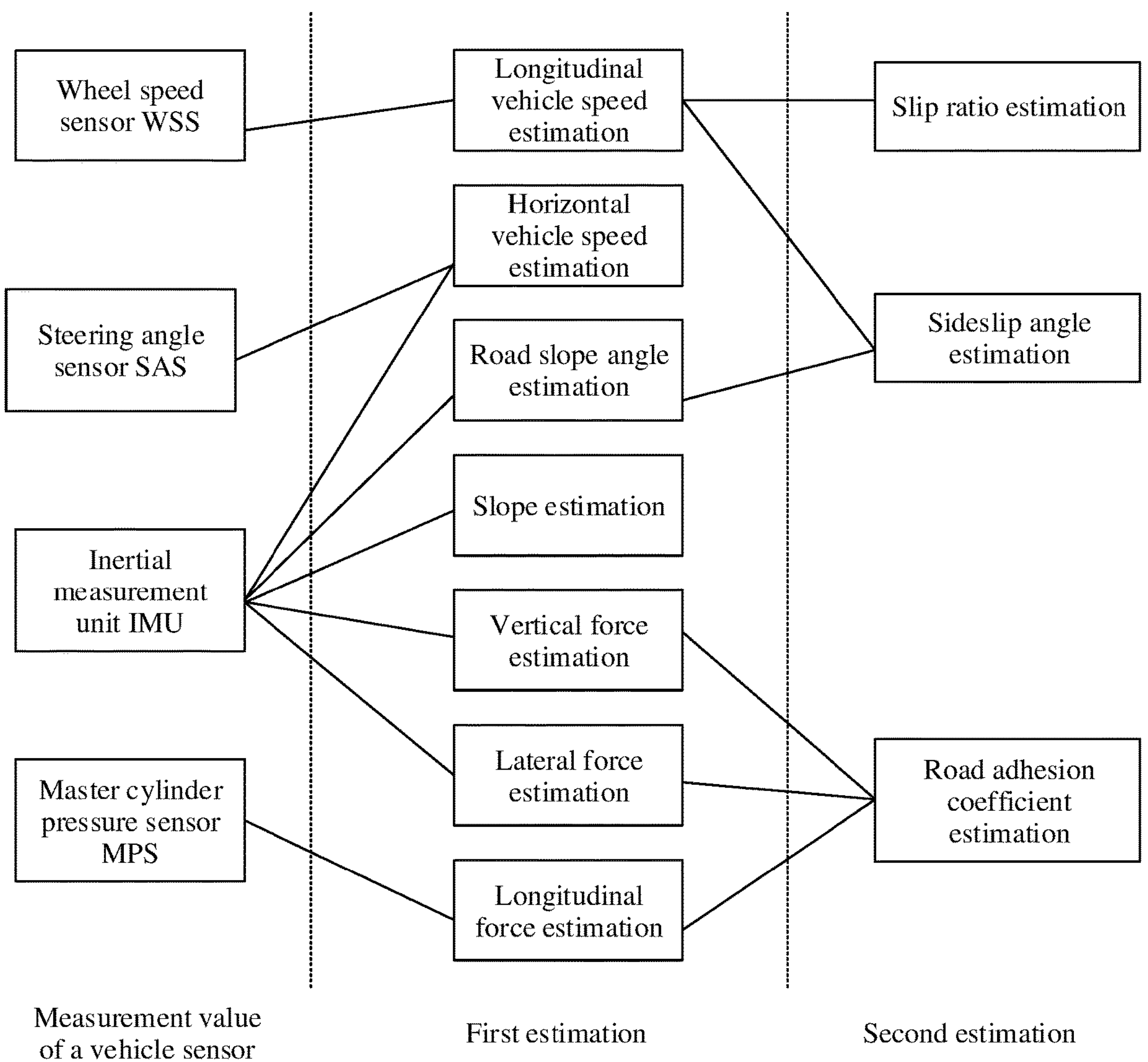
FIG. 2 is a schematic diagram of a vehicle status estimation based on a plurality of sensors according to an embodiment of this application.

For example. FIG. 2 is a schematic diagram of a vehicle status estimation based on a plurality of sensors according to an embodiment of this application. As shown in FIG. 2, when a wheel speed sensor is used together with a steering angle sensor (SAS), an inertial measurement unit (IMU), and a master cylinder pressure sensor (MPS), a centroid sideslip angle and a road adhesion coefficient of a vehicle need to be obtained through two estimations, Estimation precision of the centroid sideslip angle and the road adhesion coefficient can be improved by reducing a quantity of estimations. Specifically, parameters such as a front left wheel speed, a front right wheel speed, a rear left wheel speed, and a rear right wheel speed of the vehicle may be obtained through measurement based on the WSS, and are respectively denoted as $\omega_{FL}$, $\omega_{FR}$, $\omega_{RL}$, and $\omega_{RR}$. The parameters are briefly referred to as WSS measurement values for ease of description. Parameters such as a steering wheel angle that are obtained through measurement based on the SAS are briefly referred to as SAS measurement values for ease of description. Parameters such as a longitudinal acceleration, a horizontal acceleration, and a yaw angular velocity that are obtained through measurement based on the IMU are briefly referred to as IMU measurement values for ease of description. Parameters such as a master cylinder pressure value that are obtained through measurement based on the MPS are briefly referred to as MPS measurement values for ease of description. In a first estimation, a longitudinal vehicle speed may be obtained through estimation based on the WSS measurement values, a horizontal vehicle speed may be obtained through estimation based on the SAS measurement value and the IMU measurement values, a road bank angle, a slope, a vertical force, a lateral force, and the like may be separately obtained through estimation based on the IMU measurement values, and a longitudinal force and the like are obtained through estimation based on the MPS measurement value. In a second estimation, a slip ratio may be calculated based on the longitudinal vehicle speed obtained in the first estimation, a sideslip angle may be calculated based on the longitudinal vehicle speed and the road bank angle, and a road adhesion coefficient and the like may be obtained through estimation based on the vertical force, the lateral force, and the longitudinal force.

The following further describes a vehicle status parameter estimation system provided in embodiments of this application.

Figure 3:
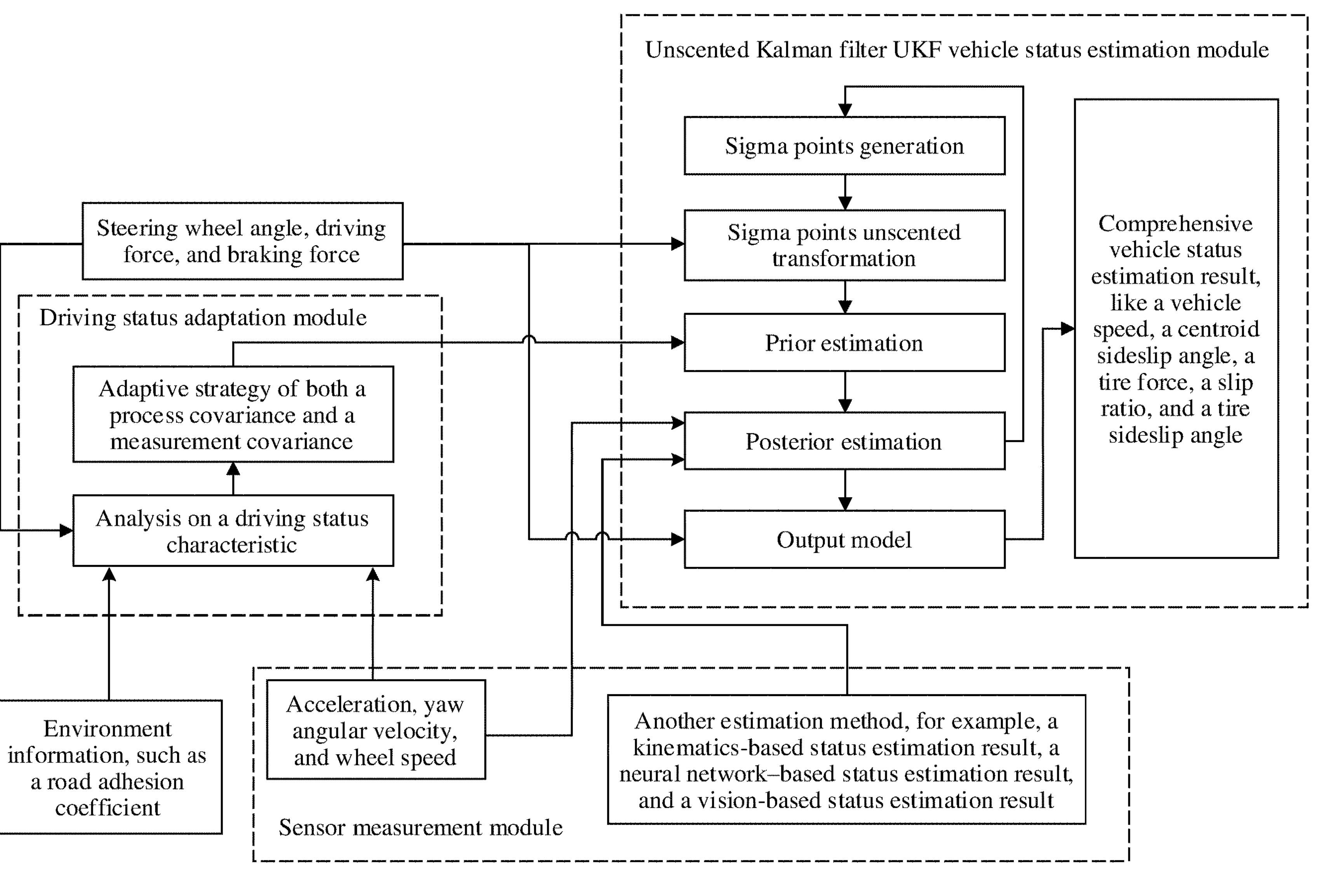
FIG. 3 is a schematic diagram of an architecture of a vehicle status parameter estimation system according to an embodiment of this application.

For example. FIG. 3 is a schematic diagram of an architecture of a vehicle status parameter estimation system according to an embodiment of this application. As shown in FIG. 3, the vehicle status parameter estimation system mainly includes three modules: (1) sensor measurement module. (2) driving status adaptation module, and (3) UKF vehicle status estimation module. The (1) sensor measurement module includes real sensor measurement and virtual sensor measurement. A measurement value of the sensor measurement module is used as an input of the UKF vehicle status estimation module, and is mainly used for a posterior estimation sub-module. The real sensor measurement mainly includes information, such as an acceleration (for example, a horizontal acceleration and a longitudinal acceleration of a vehicle) and a yaw angular velocity of the vehicle, that is obtained through measurement by an inertial measurement unit (IMU), and information, such as wheel speeds of four wheels, that is obtained through measurement by a wheel speed sensor (WSS). This is not limited herein. In the virtual sensor measurement, a result of another status estimation method is mainly used as a virtual measurement value and is input to the UKF vehicle status estimation module. The result mainly includes a kinematics-based status estimation result, a neural network-based status estimation result, a vision-based status estimation result, and the like. This is not limited herein.

The (2) driving status adaptation module obtains motion status information (for example, an acceleration, a yaw angular velocity, a wheel speed, a steering wheel angle, a driving torque, and a braking torque) of the vehicle, related environment information (for example, a road adhesion coefficient), and the like to analyze a driving status characteristic, and determines an adaptive strategy of a process covariance and a measurement covariance based on an analysis result of the driving status characteristic, that is, performs adaptive adjustment on the process covariance and the measurement covariance. This module can resolve dependence of a UKF on dynamic model precision, and improve estimation precision and fusion precision of the dynamic UKF.

The (3) UKF vehicle status estimation module uses an unscented Kalman filter method to comprehensively estimate a vehicle status, for example, a vehicle speed, a centroid sideslip angle, a tire force, a slip ratio, a tire sideslip angle. This module mainly includes the following five sub-modules: a sigma points generation sub-module, a sigma points unscented transformation sub-module, a prior estimation sub-module, a posterior estimation sub-module, and an output model sub-module. For functions of the five sub-modules, refer to description of steps in a process shown in FIG. 4, and details are not described herein.

Figure 4:
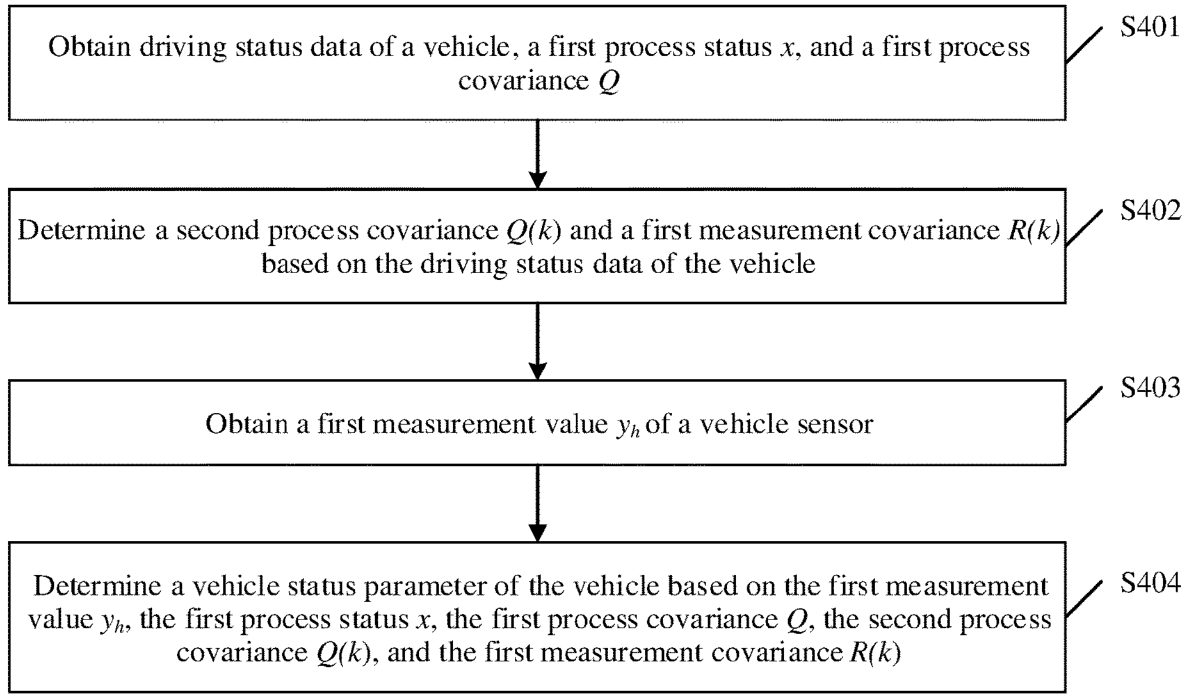
FIG. 4 is a schematic flowchart of a vehicle status parameter estimation method according to an embodiment of this application.

FIG. 4 is a schematic flowchart of a vehicle status parameter estimation method according to an embodiment of this application. The method may be performed based on a vehicle status parameter estimation apparatus, and the method includes at least the following steps S401 to S404.

S401: Obtain driving status data of a vehicle, a first process status x, and a first process covariance Q.

In some feasible implementations, if a vehicle status parameter needs to be estimated, the driving status data of the vehicle, the first process status x, and the first process covariance Q may be first obtained. The driving status data of the vehicle may include environment information and motion status information of the vehicle during vehicle running. For example, the environment information may include a road adhesion coefficient $\mu$, and the like, and the motion status information of the vehicle may include an acceleration (for example, a horizontal acceleration $a_y$ and a longitudinal acceleration $a_x$), a yaw angular velocity r, a wheel speed (for example, a front left wheel speed $\omega_{FL}$, a front right wheel speed $\omega_{FR}$, a rear left wheel speed $\omega_{RL}$, and a rear right wheel speed $\omega_{RR}$ of the vehicle), a steering wheel speed $\dot{\delta}$, a driving torque, a braking torque, and the like. This is not limited herein. It should be noted that, in this embodiment of this application, a derivative of the yaw angular velocity r is equal to a yaw angular acceleration. For ease of description, the yaw angular acceleration may be denoted as $\dot{r}$. A derivative of a steering wheel angle $\delta$ obtained through SAS measurement is equal to the steering wheel speed. For ease of description, the steering wheel speed may be denoted as $\dot{\delta}$. A product of the yaw angular acceleration r and a longitudinal speed $v_x$ is equal to a lateral acceleration change rate. For ease of description, the lateral acceleration change rate in this application may be denoted as $\dot{r}V$. $V=v_x$. Therefore, the driving status data in this embodiment of this application may include one or more of the following parameters: the lateral acceleration change rate $\dot{r}V$, the steering wheel speed $\dot{\delta}$, the horizontal acceleration $a_y$, the road adhesion coefficient μ, the front left wheel speed $\omega_{FL}$, the front right wheel speed $\omega_{FR}$, the rear left wheel speed $\omega_{RL}$, or the rear right wheel speed $\omega_{RR}$.

The first process status x may include one or more of the following parameters: the longitudinal speed $v_x$, a horizontal speed $v_y$, the yaw angular velocity r, the front left wheel speed $\omega_{FL}$, the front right wheel speed $\omega_{FR}$, the rear left wheel speed $\omega_{RL}$, the rear right wheel speed $\omega_{RR}$, or the road adhesion coefficient μ. This is not limited herein. In other words, the first process status in this embodiment of this application may be defined as the following matrix x.

$$x=[v_x, v_y, r, \omega_{FL}, \omega_{FR}, \omega_{RL}, \omega_{RR}, \mu]$$

Correspondingly, the first process covariance Q(k) may be defined as a diagonal matrix Q1. Q1=diag($[q_{v_x}, q_{v_y}, q_r, q_{\omega_{FL}}, q_{\omega_{FR}}, q_{\omega_{RL}}, q_{\omega_{RR}}, q_\mu]$). In other words, $$Q1=\begin{bmatrix} q_{v_x} &&&&&&& \\ & q_{v_y} &&&&&& \\ && q_r &&&&& \\ &&& q_{\omega_{FL}} &&&& \\ &&&& q_{\omega_{FR}} &&& \\ &&&&& q_{\omega_{RL}} && \\ &&&&&& q_{\omega_{RR}} & \\ &&&&&&& q_\mu \end{bmatrix}$$

Herein, $q_{v_x}$ represents a process covariance coefficient corresponding to the longitudinal speed, $q_{v_y}$ represents a process covariance coefficient corresponding to the horizontal speed, $q_r$ represents a process covariance coefficient corresponding to the yaw angular velocity, $q_{\omega_{FL}}$ represents a process covariance coefficient corresponding to the front left wheel speed, $q_{\omega_{FR}}$ represents a process covariance coefficient corresponding to the front right wheel speed, $q_{\omega_{RL}}$ represents a process covariance coefficient corresponding to the rear left wheel speed, $q_{\omega_{RR}}$ represents a process covariance coefficient corresponding to the front right wheel speed, $q_\mu$ represents a process covariance coefficient corresponding to the road adhesion coefficient.

S402: Determine a second process covariance Q(k) and a first measurement covariance R(k) based on the driving status data of the vehicle.

In some feasible implementations, the second process covariance Q(k) and the first measurement covariance R(k) are determined based on the driving status data of the vehicle. Specifically, the determining the second process covariance Q(k) based on the driving status data of the vehicle may be understood as: when the road adhesion coefficient μ is greater than or equal to a first preset road adhesion coefficient threshold $\mu_{TH}$, and an absolute value $|\dot{r}V|$ of the lateral acceleration change rate is greater than a preset lateral acceleration change rate threshold $\dot{r}V_{TH}$ and/or an absolute value $[\dot{\delta}]$ of the steering wheel speed is greater than a preset steering wheel speed threshold $\dot{\delta}_{TH}$, obtaining a first preset process covariance matrix as the second process covariance Q(k); or when the road adhesion coefficient μ is greater than or equal to the first preset road adhesion coefficient threshold $\mu_{TH}$, and the absolute value $|\dot{r}V|$ of the lateral acceleration change rate is less than or equal to the preset lateral acceleration change rate threshold $\dot{r}V_{TH}$ and the absolute value $|\dot{\delta}|$ of the steering wheel speed is less than or equal to the preset steering wheel speed threshold $\dot{\delta}_{TH}$, determining the second process covariance Q(k) based on the horizontal acceleration $a_y$; or when the road adhesion coefficient μ is less than the first preset road adhesion coefficient threshold $\mu_{TH}$, and the absolute value $|\dot{r}V|$ of the lateral acceleration change rate is greater than the preset lateral acceleration change rate threshold $\dot{r}V_{TH}$ and/or the absolute value $|\dot{\delta}|$ of the steering wheel speed is greater than the preset steering wheel speed threshold $\dot{\delta}_{TH}$, obtaining a second preset process covariance matrix as the second process covariance Q(k); or when the road adhesion coefficient μ is less than the first preset road adhesion coefficient threshold $\mu_{TH}$, and the absolute value $|\dot{r}V|$ of the lateral acceleration change rate is less than or equal to the preset lateral acceleration change rate threshold $\dot{r}V_{TH}$ and the absolute value $|\dot{\delta}|$ of the steering wheel speed is less than or equal to the preset steering wheel speed threshold $\dot{\delta}_{TH}$, obtaining a third preset process covariance matrix as the second process covariance Q(k).

Figure 5:
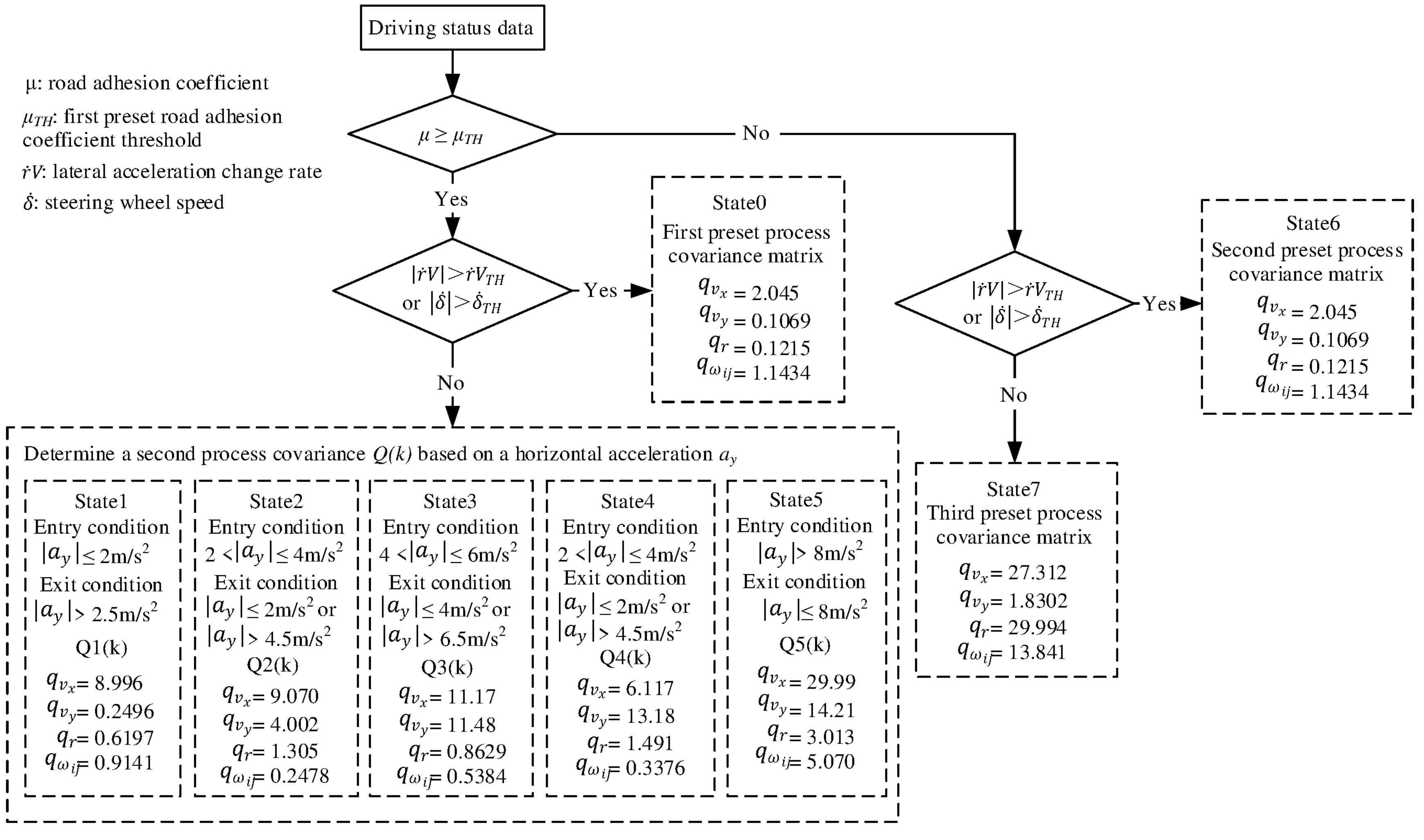
FIG. 5 is a schematic diagram of determining a second process covariance Q(k) based on driving status data according to an embodiment of this application.

For example, FIG. 5 is a schematic diagram of determining a second process covariance Q(k) based on driving status data according to an embodiment of this application. As shown in FIG. 5, when the vehicle drives on a road surface whose road adhesion coefficient μ is greater than or equal to a specified road adhesion coefficient threshold (namely, the first preset road adhesion coefficient threshold $\mu_{TH}$), if the absolute value $|\dot{r}V|$ of the lateral acceleration change rate is greater than a specified lateral acceleration change rate threshold (namely; the preset lateral acceleration change rate threshold $\dot{r}V_{TH}$), and/or the absolute value $|\dot{\delta}|$ of the steering wheel speed is greater than a specified steering wheel speed threshold (namely, the preset steering wheel speed threshold $\dot{\delta}_{TH}$), the second process covariance Q(k) may be the first preset process covariance matrix. For example, the first preset process covariance matrix may be an optimal process covariance matrix under a transient condition. For example, in State0 in FIG. 5, in the first preset process covariance matrix, $q_{v_x}$=2.045, $q_{v_y}$=0.1069, $q_r$=0.1215, $q_{\omega_{ij}}$=1.1434 (that is, $q_{\omega_{FL}}=q_{\omega_{FR}}=q_{\omega_{RL}}=q_{\omega_{RR}}$=1.1434). If the absolute value $|\dot{r}V|$ of the lateral acceleration change rate is less than or equal to the preset lateral acceleration change rate threshold $\dot{r}V_{TH}$, and the absolute value $|\dot{\delta}|$ of the steering wheel speed is less than or equal to the preset steering wheel speed threshold $\dot{\delta}_{TH}$, adaptive adjustment may be further performed on the second process covariance Q(k) based on an absolute value range of a horizontal acceleration $a_y$ of the vehicle, as State1 to State5 shown in FIG. 8 below. Specifically, in State1 in FIG. 5, when an entry condition of $|a_y|\leq 2$ m/s$^2$ is satisfied, the second process covariance Q(k) is Q1(k). For example, in Q1(k), $q_{v_x}$=8.996, $q_{v_y}$=0.2496, $q_r$=0.6197, $q_{\omega_{ij}}$=0.9141 (that is, $q_{\omega_{FL}}=q_{\omega_{FR}}=q_{\omega_{RL}}=q_{\omega_{RR}}$=0.9141). When an exit condition of $|a_y|>2.5$ m/s$^2$ is satisfied, the second process covariance Q(k) is no longer Q1(k). In other words, if the second process covariance Q(k) is Q1(k), when $|a_y|$ fluctuates in a range (2, 2.5 m/s$^2$], Q(k) may still be equal to Q1(k). This is because a horizontal acceleration $a_y$ of the vehicle may fluctuate continuously during actual operation of the vehicle. Therefore, to avoid a frequent change in the second process covariance Q(k), the exit condition shown in FIG. 5 needs to be set. In this case, if Q(k) is Q1(k), when the exit condition of $|a_y|>2.5$ m/s$^2$ is satisfied, Q(k) is not Q1(k). In State2 in FIG. 5, when an entry condition of $2\leq|a_y|\leq 4$ m/s$^2$ is satisfied, the second process covariance Q(k) is Q2(k). For example, in Q2(k), $q_{v_x}$=9.070, $q_{v_y}$=4.002, $q_r$=1.305, $q_{\omega_{ij}}$=0.2478 (that is, $q_{\omega_{FL}}=q_{\omega_{FR}}=q_{\omega_{RL}}=q_{\omega_{RR}}$=0.2478). When an exit condition of $|a_y|\leq 2$ or $|a_y|>4.5$ m/s$^2$ is satisfied, the second process covariance Q(k) is no longer Q2(k). In State3 in FIG. 5, when an entry condition of $4<|a_y|\leq 6$ m/s$^2$ is satisfied, the second process covariance Q(k) is Q3(k). For example, in Q3(k), $q_{v_x}=11.17$, $q_{v_y}=11.48$, $q_r=0.8629$, $q_{\omega_{ij}}=0.5384$ (that is, $q_{\omega_{FL}}=q_{\omega_{FR}}=q_{\omega_{RL}}=q_{\omega_{RR}}=0.5384$). When an exit condition of $|a_y|\leq 4$ or $|a_y|>6.5$ m/s$^2$ is satisfied, the second process covariance Q(k) is no longer Q3(k). In shown in State4 in FIG. 5, when an entry condition of $6<|a_y|\leq 8$ m/s$^2$ is satisfied, the second process covariance Q(k) is Q4(k). For example, in Q4(k), $q_{v_x}=6.117$, $q_{v_y}=13.18$, $q_r=1.491$, $q_{\omega_{ij}}=0.3376$ (that is, $q_{\omega_{FL}}=q_{\omega_{FR}}=q_{\omega_{RL}}=q_{\omega_{RR}}=0.3376$). When an exit condition of $|a_y|\leq 6$ m/s$^2$ or $|a_y|>8.5$ m/s$^2$ is satisfied, the second process covariance Q(k) is no longer Q4(k). In shown in State5 in FIG. 5, when an entry condition $|a_y|>8$ m/s$^2$ is satisfied, the second process covariance Q(k) is Q5(k). For example, in Q5(k), $q_{v_x}=29.99$, $q_{v_y}=14.21$, $q_r=3.013$, $q_{\omega_{ij}}=5.070$ (that is, $q_{\omega_{FL}}=q_{\omega_{FR}}=q_{\omega_{RL}}=q_{\omega_{RR}}=5.070$). When an exit condition of $|a_y|\leq 8$ m/s$^2$ is satisfied, the second process covariance Q(k) is no longer Q5(k).

As shown in FIG. 5, when a vehicle drives on a road surface whose road adhesion coefficient μ is less than the first preset road adhesion coefficient threshold $\mu_{TH}$, if an absolute value $|\dot{r}V|$ of a lateral acceleration change rate is greater than the preset lateral acceleration change rate threshold $\dot{r}V_{TH}$, and/or an absolute value $|\dot{\delta}|$ of a steering wheel speed is greater than a preset steering wheel speed threshold $\dot{\delta}_{TH}$, the second process covariance Q(k) may be a second preset process covariance matrix. The first preset process covariance matrix and the second preset process covariance matrix may be the same or may be different. This is not limited herein. For example, in State6 in FIG. 5, in the second preset process covariance matrix, $q_{v_x}=2.045$, $q_{v_y}=0.1069$, $q_r=0.1215$, $q_{\omega_{ij}}=1.1434$ (that is, $q_{\omega_{FL}}=q_{\omega_{FR}}=q_{\omega_{RL}}=q_{\omega_{RR}}=1.1434$). If the absolute value $|\dot{r}V|$ of the lateral acceleration change rate is less than or equal to the preset lateral acceleration change rate threshold $\dot{r}V_{TH}$, and the absolute value $|\dot{\delta}|$ of the steering wheel speed is less than or equal to the preset steering wheel speed threshold $\dot{\delta}_{TH}$, the second process covariance Q(k) is the second preset process covariance matrix. For example, in State7 in FIG. 5, in a third preset process covariance matrix, $q_{v_x}=27.312$, $q_{v_y}=1.8402$, $q_r=29.994$, $q_{\omega_{ij}}=13.841$ (that is, $q_{\omega_{FL}}=q_{\omega_{FR}}=q_{\omega_{RL}}=q_{\omega_{RR}}=13.841$).

It should be noted that $q_\mu$ values in state0) to state7 in FIG. 5 may be the same or different. $q_\mu$ may be a preset value, or may be a value calculated based on a road adhesion coefficient of an actual road surface on which the vehicle drives. This is not limited herein.

In some feasible implementations, the determining a first measurement covariance R(k) based on the driving status data of the vehicle may be understood as: when a maximum value $\max|\Delta\omega_i|$ of absolute values of wheel speeds of different wheels is greater than a preset wheel speed difference threshold $\Delta\omega_{TH}$, and/or a minimum value $\min|\omega_i|$ of absolute values of wheel speeds of different wheels is less than a preset wheel speed threshold $\omega_{TH}$, obtaining a first preset measurement covariance matrix as the first measurement covariance R(k); or when the maximum value $\max|\Delta\omega_i|$ of the absolute value of the wheel speed difference between the different wheels is less than or equal to the preset wheel speed difference threshold $\Delta\omega_{TH}$, and the minimum value $\min|\omega_i|$ of the absolute values of the wheel speeds of the different wheels is greater than or equal to the preset wheel speed threshold $\omega_{TH}$, determine the first measurement covariance R(k) based on the road adhesion coefficient μ. The determining the first measurement covariance R(k) based on the road adhesion coefficient μ may be understood as: when the road adhesion coefficient μ is greater than or equal to a second preset road adhesion coefficient threshold $$\mu'_{TH},$$

obtain a second preset measurement covariance matrix as the first measurement covariance R(k); or when the road adhesion coefficient μ is less than the second preset road adhesion coefficient threshold $$\mu'_{TH},$$

obtaining a third preset measurement covariance matrix as the first measurement covariance R(k).

In one implementation, the first measurement covariance R(k) may be defined as a diagonal matrix R1. $R1=\mathrm{diag}([r_{a_x}, r_{a_y}, r_r, r_{\omega_{FL}}, r_{\omega_{FR}}, r_{\omega_{RL}}, r_{\omega_{RR}}])$. In other words, $$R1 = \begin{bmatrix} r_{a_x} & & & & & & \\ & r_{a_y} & & & & & \\ & & r_r & & & & \\ & & & r_{\omega FL} & & & \\ & & & & r_{\omega FR} & & \\ & & & & & r_{\omega RL} & \\ & & & & & & r_{\omega RR} \end{bmatrix}$$

$r_{a_x}$, $r_{a_y}$, and $r_r$ respectively represent a measurement covariance coefficient corresponding to longitudinal acceleration measurement, a measurement covariance coefficient corresponding to horizontal acceleration measurement, and a measurement covariance coefficient corresponding to yaw angular velocity measurement. $r_{\omega_{FL}}$, $r_{\omega_{FR}}$, $r_{\omega_{RL}}$, and $r_{\omega_{RR}}$ respectively represent a measurement covariance coefficient corresponding to front left wheel speed measurement, a measurement covariance coefficient corresponding to front right wheel speed measurement, a measurement covariance coefficient corresponding to rear left wheel speed measurement, and a measurement covariance coefficient corresponding to rear right wheel speed measurement.

Optionally, the first measurement covariance R(k) may alternatively be defined as a diagonal matrix R2. $R2=\mathrm{diag}(r_{a_x}, r_{a_y}, r_r, r_{\omega_{FL}}, r_{\omega_{FR}}, r_{\omega_{RL}}, r_{\omega_{RR}}, r_{\beta_{Kimematix}}, r_{\beta_{NN}}, r_{\beta_{camera}}])$. In other words,

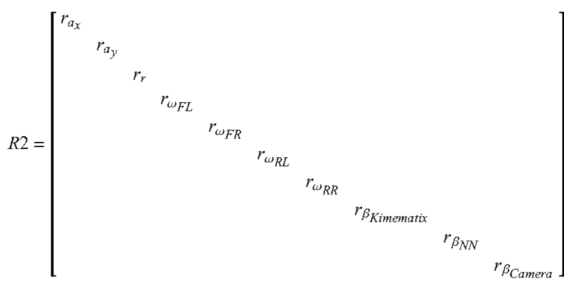

$$R2 = \begin{bmatrix} r_{a_x} & & & & & & & & & \\ & r_{a_y} & & & & & & & & \\ & & r_r & & & & & & & \\ & & & r_{\omega FL} & & & & & & \\ & & & & r_{\omega FR} & & & & & \\ & & & & & r_{\omega RL} & & & & \\ & & & & & & r_{\omega RR} & & & \\ & & & & & & & r_{\beta Kimematix} & & \\ & & & & & & & & r_{\beta NN} & \\ & & & & & & & & & r_{\beta Camera} \end{bmatrix}$$

$r_{a_x}$, $r_{a_y}$, and $r_r$ respectively represent a measurement covariance coefficient corresponding to the longitudinal acceleration, a measurement covariance coefficient corresponding to the horizontal acceleration, and a measurement covariance coefficient corresponding to the yaw angular velocity. $r_{\omega_{FL}}$, $r_{\omega_{FR}}$, $r_{\omega_{RL}}$, and $r_{\omega_{RR}}$ respectively represent a measurement covariance coefficient corresponding to the front left wheel speed, a measurement covariance coefficient corresponding to the front right wheel speed, a measurement covariance coefficient corresponding to the rear left wheel speed, and a measurement covariance coefficient corresponding to the rear right wheel speed. $r_{\beta_{Kinematix}}$, $r_{\beta_{NN}}$, and $r_{\beta_{camera}}$ respectively represent a measurement covariance coefficient corresponding to a vehicle centroid sideslip angle obtained through kinematics-based estimation, a measurement covariance coefficient corresponding to a vehicle centroid sideslip angle obtained through neural network-based estimation, and a measurement covariance coefficient corresponding to a vehicle centroid sideslip angle obtained through vision-based estimation.

Figure 6:
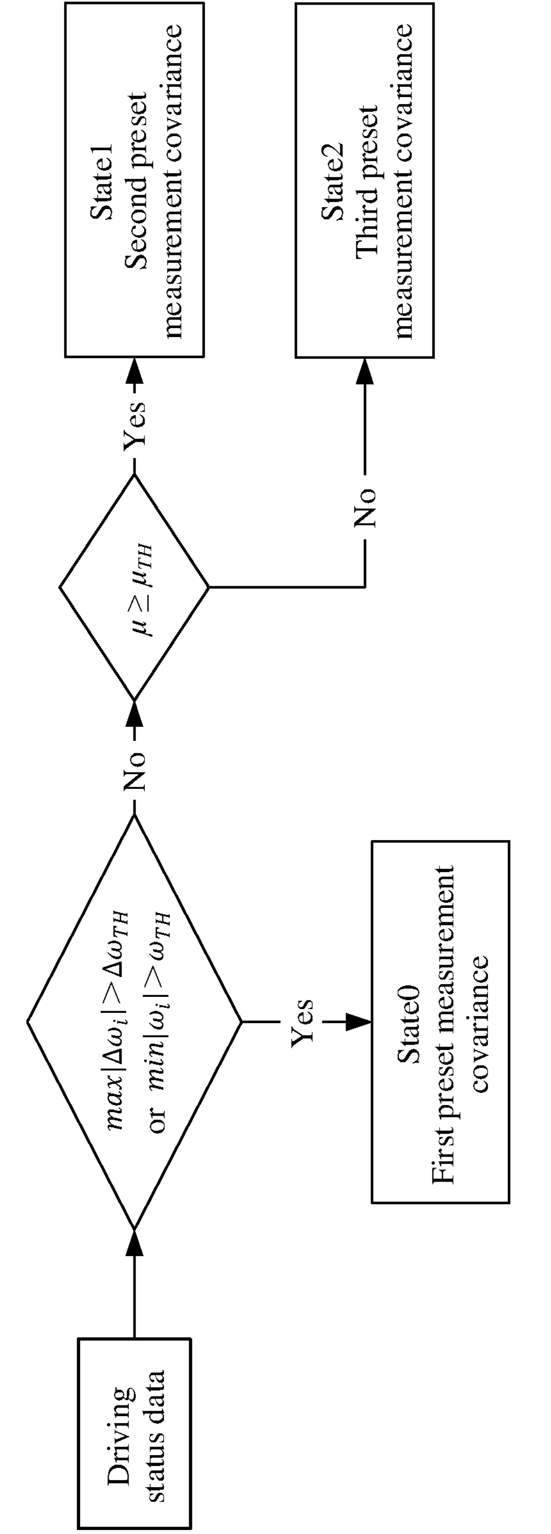
FIG. 6 is a schematic diagram of determining a first measurement covariance R(k) based on driving status data according to an embodiment of this application.

For example, FIG. 6 is a schematic diagram of determining a first measurement covariance R(k) based on driving status data according to an embodiment of this application. As shown in FIG. 6, when the maximum value $\max|\Delta\omega_i|$ of the absolute value of the wheel speed difference between the different wheels is greater than a specified wheel speed difference threshold (namely, the preset wheel speed threshold $\omega_{TH}$), and/or the minimum value $\min|\omega_i|$ of the absolute value of the wheel speed difference between the different wheels is less than a specified wheel speed difference threshold (namely, the preset wheel speed threshold $\omega_{TH}$), the first measurement covariance R(k) is a first preset measurement covariance matrix corresponding State( ) in FIG. 6. For example, the second preset measurement covariance matrix may be an optimal measurement covariance matrix during wheel lock or slip. When the maximum value $\max|\Delta\omega_i|$ of the absolute value of the wheel speed difference between the different wheels is less than or equal to the preset wheel speed threshold $\omega_{TH}$, and the minimum value $\min|\omega_i|$ of the absolute values of the wheel speeds of the different wheels is greater than or equal to the preset wheel speed threshold $\omega_{TH}$, adaptive adjustment is further performed on the measurement covariance based on the road adhesion coefficient. When the road adhesion coefficient μ is greater than a second preset road adhesion coefficient threshold $$\mu'_{TH},$$

the first measurement covariance R(k) is a second preset measurement covariance matrix corresponding to state1 in FIG. 6. For example, the second preset measurement covariance matrix may be an optimal process covariance matrix under a high-adhesion condition. When the road adhesion coefficient μ is less than or equal to the second preset road adhesion coefficient threshold $$\mu'_{TH},$$

the first measurement covariance R(k) is a third preset measurement covariance matrix corresponding to state2 in FIG. 6. For example, the third preset measurement covariance matrix may be an optimal process covariance matrix under a low-adhesion condition.

S403: Obtain a first measurement value $y_h$ of a vehicle sensor.

In some feasible implementations, the first measurement value $y_h$ of the vehicle sensor is obtained. The first measurement value $y_h$ of the vehicle sensor may include a measurement value measured by a real vehicle sensor. For example, the first measurement value $y_h$ may include the longitudinal acceleration $a_x$, the horizontal acceleration $a_y$, and the yaw angular velocity r that are obtained through IMU measurement, the front left wheel speed $\omega_{FL}$, the front right wheel speed $\omega_{FR}$, the rear left wheel speed $\omega_{RL}$, the rear right wheel speed $\omega_{RR}$, and the like that are obtained through WSS measurement. This is not limited herein. In other words, $y_h=[a_x, a_y, r, \omega_{FL}, \omega_{FR}, \omega_{RL}, \omega_{RR}]$. Correspondingly, the first measured covariance $R(k)=\mathrm{diag}([r_{a_x}, r_{a_y}, r_r, r_{\omega_{FL}}, r_{\omega_{FR}}, r_{\omega_{RL}}, r_{\omega_{RR}}])$.

Optionally, the first measurement value $y_h$ may alternatively include a measurement value measured by a real vehicle sensor and a measurement value obtained based on a virtual vehicle sensor. The measurement value of the vehicle virtual sensor may include a measurement value obtained through neural network-based estimation, and/or a measurement value obtained through kinematics-based status estimation, and/or a measurement value obtained through vision-based status estimation. This is not limited herein. For example, a vehicle centroid sideslip angle $\beta_{Kinematic}$ is obtained through kinematics-based status estimation, a vehicle centroid sideslip angle $\beta_{NN}$ is obtained through neural network-based status estimation, and a vehicle centroid sideslip angle $\beta_{camera}$ is obtained through vision-based status estimation. Therefore, the first measurement value $y_h=[a_x, a_y, r, \omega_{FL}, \omega_{FR}, \omega_{RL}, \omega_{RR}, \beta_{Kinematic}, \beta_{NN}, \beta_{Camera}]$. Correspondingly, the first measurement covariance $R(k)=\mathrm{diag}([r_{a_x}, r_{a_y}, r_r, r_{\omega_{FL}}, r_{\omega_{FR}}, r_{\omega_{RL}}, r_{\omega_{RR}}, r_{\beta_{Kinematix}}, r_{\beta_{NN}}, r_{\beta_{Camera}}])$, and the like. This is determined based on an actual scenario. This is not limited herein. For ease of understanding, the first measurement value in this embodiment of this application uses an example in which the first measurement value includes the measurement value measured by the real vehicle sensor and the measurement value obtained based on the virtual vehicle sensor, and the first measurement covariance includes a measurement covariance coefficient corresponding to the measurement value of the real vehicle sensor and a measurement covariance coefficient corresponding to the measurement value of the virtual vehicle sensor.

It should be noted that, in this application, the measurement value and the measured covariance of the real vehicle sensor are extended, that is, in addition to the measurement value measured by the real vehicle sensor, the first measurement value $y_h$ further includes the measurement value obtained based on the virtual vehicle sensor. Correspondingly, in addition to the measurement covariance coefficient corresponding to the measurement value of the real vehicle sensor, the first measurement covariance further includes the measurement covariance coefficient corresponding to the measurement value of the virtual vehicle sensor. This can improve estimation precision of the vehicle status parameter.

S404: Determine a vehicle status parameter of the vehicle based on the first measurement value $y_h$, the first process status x, the first process covariance Q, the second process covariance Q(k), and the first measurement covariance R(k).

In some feasible implementations, a vehicle status parameter of the vehicle is determined based on the first measurement value $y_h$, the first process status x, the first process covariance Q, the second process covariance Q(k), and the first measurement covariance R(k). Specifically, the determining a vehicle status parameter of the vehicle based on the first measurement value $y_h$, the first process status x, the first process covariance Q, the second process covariance Q(k), and the first measurement covariance R(k) may be understood as: determining first key point data $\chi_i(k+1|k)$ and a second measurement value $\gamma_i(k)$ based on the first process status x and the first process covariance Q, where both the first key point data $\chi_i(k+1|k)$ and the second measurement value $\gamma_i(k)$ satisfy Gaussian distribution; and determining the vehicle status parameter of the vehicle based on the first key point data $\chi_i(k+1|k)$, the second measurement value $\gamma_i(k)$, the second process covariance Q(k), the first measurement covariance R(k), and the first measurement value $y_h$. The determining the vehicle status parameter of the vehicle based on the first key point data $\chi_i(k+1|k)$, the second measurement value $\gamma_i(k)$, the second process covariance Q(k), the first measurement covariance R(k), the first measurement value $y_h$, and a control variable status u(k) may be understood as: determining a prior process status $\hat{x}(k+1|k)$ and a prior process covariance $\hat{P}(k+1|k)$ based on the first key point data $\chi_i(k+1|k)$ and the second process covariance Q(k); determining a measurement estimated value $\hat{y}_h(k)$ and a measurement estimated covariance $\hat{P}_y(k)$ based on the second measurement value $\gamma_i(k)$ and the first measurement covariance R(k); determining a Kalman feedback gain matrix K(k+1|k) based on the first key point data $\chi_i(k+1|k)$, the second measurement value $\gamma_i(k)$, the prior process status $\hat{x}$ (k+1|k), the measurement estimated value $\hat{y}_h(k)$ and the measurement estimated covariance $\hat{P}_y(k)$; determining a posterior process status $\hat{x}(k+1)$ and a posterior process covariance $\hat{P}(k+1)$ based on the Kalman feedback gain matrix K(k+1|k), the prior process covariance $\hat{P}(k+1|k)$, the measurement estimated covariance $\hat{P}_y(k)$, the prior process status $\hat{x}(k+1|k)$, the measurement estimated value $\hat{y}_h(k)$, and the first measurement value $y_h(k)$; and determining the vehicle status parameter of the vehicle based on the posterior process status $\hat{x}(k+1)$.

Figure 7:
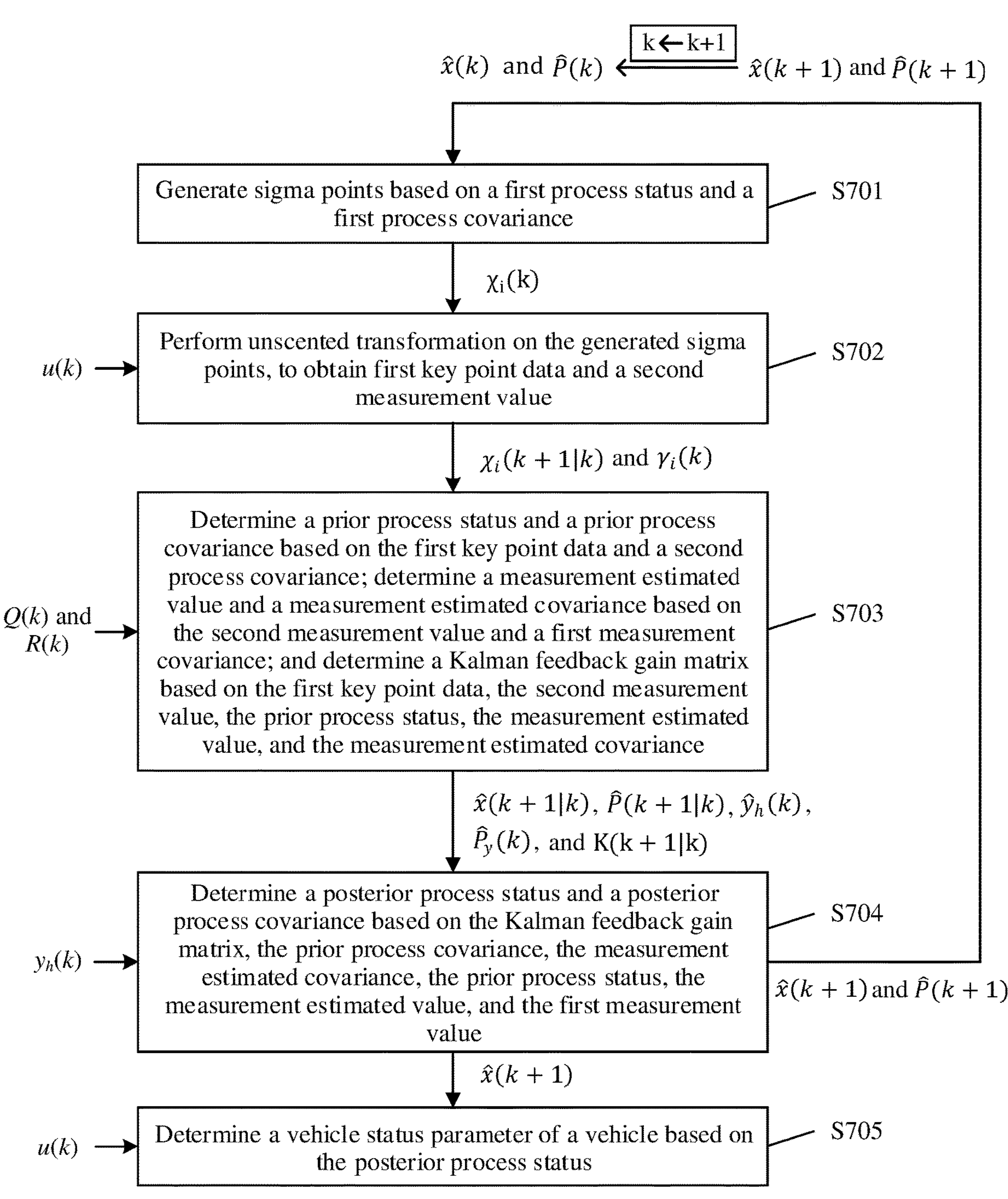
FIG. 7 is a schematic flowchart of another vehicle status parameter estimation method according to an embodiment of this application.

For example, FIG. 7 is a schematic flowchart of another vehicle status parameter estimation method according to an embodiment of this application. As shown in FIG. 7, the method mainly includes the following steps S701 to S705.

S701: Generate sigma points based on a first process status and a first process covariance.

In an implementation, a first process status x and a first process covariance Q at a moment k are obtained, and then the sigma points may be generated based on the first process status x and the first process covariance Q. Specifically, the sigma points $\chi_i(k)$ at the moment k may be generated based on a sampling value x (k) of the first process status x at the moment k and a sampling value $\hat{P}(k)$ of the first process covariance Q at the moment k. The generated sigma points $\chi_i(k)$ satisfy:

$$\chi_i(k) = \begin{cases} \hat{x}(k) & i = 0 \\ \hat{x}(k) + \left(\sqrt{(n+\lambda)\hat{P}(k)}\right)_i & i = 1, 2, \ldots n \\ \hat{x}(k) - \left(\sqrt{(n+\lambda)\hat{P}(k)}\right)_i & i = n+1, n+2, \ldots 2n \end{cases}$$

$\chi_i(k)$ represents sigma points at the moment k. $\hat{x}(k)$ represents the sampling value of the first process status x at the moment k. $\hat{P}(k)$ represents the sampling value of the first process covariance Q at the moment k. n represents a dimension (for example, n=8) of the first process status x. A represents a preset coefficient used to calculate a weight. It should be noted that the sigma points are a series of representative points extracted from original Gaussian distribution (namely, Gaussian distribution based on an average value of the first process status and the first process covariance), are distributed around the average value of the first process status and represent the entire Gaussian distribution. More points extracted from the original Gaussian distribution usually indicate that a UKF approximates a nonlinear model more accurately.

S702: Perform unscented transformation on the generated sigma points, to obtain first key point data and a second measurement value.

In an implementation, the first key point data $\chi_i(k+1|k)$ and the second measurement value $\gamma_i(k)$ may be obtained by performing unscented transformation on the generated sigma points. Specifically, unscented transformation may be separately performed on the generated sigma points $\chi_i(k)$ based on a seven-degree of freedom (DOF) nonlinear vehicle dynamics model and a measurement model, to obtain new sigma points, namely, the first key point data $\chi_i(k+1|k)$, at a moment k+1 obtained through prediction at the moment k and obtain the second measurement value $\gamma_i(k)$ based on $\chi_i(k)$. It should be noted that the new sigma points (namely, the first key point data $\chi_i(k+1|k)$) and the second measurement value obtained through transformation may also be approximated to new Gaussian distribution. Specifically, the first key point data $\chi_i(k+1|k)$ and the second measurement value $\gamma_i(k)$ respectively satisfy:

$$\chi_i(k+1|k) = f(\chi_i(k), u(k)) + w$$

$$\gamma_i(k) = h(\chi_i(k), u(k)) + v$$

f represents a status transition function. u(k) represents a control variable status. w represents a process noise. h represents a measurement function. v represents a measurement noise.

S703: Determine a prior process status and a prior process covariance based on the first key point data and a second process covariance: determine a measurement estimated value and a measurement estimated covariance based on the second measurement value and a first measurement covariance; and determine a Kalman feedback gain matrix based on the first key point data, the second measurement value, the prior process status, the measurement estimated value, and the measurement estimated covariance.

In an implementation, first, the prior process status $\hat{x}(k+1|k)$ and the prior process covariance $\hat{P}(k+1|k)$ may be determined based on the first key point data $\chi_i(k+1|k)$ and the second process covariance Q(k). In other words, prior estimation may be performed on the process status and the process covariance based on the first key point data $\chi_i(k+1|k)$ and the second process covariance Q(k), to obtain the prior process status $\hat{x}(k+1|k)$ and the prior process covariance $\hat{P}(k+1|k)$ Specifically, the prior process status $\hat{x}(k+1|k)$ and the prior process covariance $\hat{P}(k+1|k)$ respectively satisfy:

$$\hat{x}(k+1|k) = \sum_{i=0}^{2n} W_i^{(m)} \chi_i(k+1|k)$$

$$\hat{P}(k+1|k) = [(\chi_i(k+1|k) - \hat{x}(k+1|k))] \times \begin{bmatrix} W_0^{(c)} & & & \\ & W_1^{(c)} & & \\ & & \ddots & \\ & & & W_{2n}^{(c)} \end{bmatrix} \times [(\chi_i(k+1|k) - \hat{x}(k+1|k))]^T + Q(k)$$

$\hat{x}$(k+1|k) represents the prior process status, namely, a process status at the moment k+1 obtained through prediction at the moment k. $\hat{P}$(k+1|k) represents the prior process covariance, namely, a process covariance at the moment k+1 obtained through prediction at the moment k.

$$W_i^{(m)}$$

represents a weight coefficient.

Then, the measurement estimated value $\hat{y}_h$(k) and the measurement estimated covariance $\hat{P}_y$(k) are determined based on the second measurement value $\gamma_i$(k) and the first measurement covariance R(k). In other words, estimation is performed on the measurement estimated value $\hat{y}_h$(k) and the measurement estimated covariance $\hat{P}_y$(k) based on the second measurement value $\gamma_i$(k) and the first measurement covariance R(k). Specifically, the measurement estimated value $\hat{y}_h$(k) and the measurement estimated covariance $\hat{P}_y$(k) respectively satisfy:

$$\hat{y}_h(k) = \sum_{i=0}^{2n} W_i^{(m)} \gamma_i(k)$$

$$\hat{P}_y(k) = [(\gamma_i(k) - \hat{y}_h(k))] \times \begin{bmatrix} W_0^{(c)} & & & \\ & W_1^{(c)} & & \\ & & \ddots & \\ & & & W_{2n}^{(c)} \end{bmatrix} \times [(\gamma_i(k) - \hat{y}_h(k))]^T + R(k)$$

Further, a cross-covariance matrix $\hat{P}_{x,y}$(k+1|k) is calculated based on $\gamma_i$(k), the measurement estimated value $\hat{y}_h$(k), the first key point data $\chi_i$(k+1|k), and the prior process status $\hat{x}$(k+1|k). Specifically, the cross-covariance matrix $\hat{P}_{x,y}$(k+1|k) satisfies:

$$\hat{P}_{x,y}(k+1|k) = [(\chi_i(k+1|k) - \hat{x}(k+1|k))] \times \begin{bmatrix} W_0^{(c)} & & & \\ & W_1^{(c)} & & \\ & & \ddots & \\ & & & W_{2n}^{(c)} \end{bmatrix} \times [(\gamma_i(k) - \hat{y}_h(k))]^T$$

Further, the Kalman feedback gain matrix K(k+1|k) is obtained through calculation based on the measurement estimated covariance $\hat{P}_y$(k) and the cross-covariance matrix $\hat{P}_{x,y}$(k+1|k). Specifically, the Kalman feedback gain matrix K(k+1|k) satisfies:

$$K(k+1|k) = \hat{P}_{x,y}(k+1|k) * \hat{P}_y^{-1}(k)$$

S704: Determine a posterior process status and a posterior process covariance based on the Kalman feedback gain matrix, the prior process covariance, the measurement estimated covariance, the prior process status, the measurement estimated value, and the first measurement value.

In one implementation, the posterior status $\hat{x}$(k+1) and the posterior process covariance $\hat{P}$(k+1) may be determined based on the Kalman feedback gain matrix K(k+1|k), the prior process covariance $\hat{P}$(k+1|k), the measurement estimated covariance $\hat{P}_y$(k), the prior process status $\hat{x}$(k+1|k), the measurement estimated value $\hat{y}_h$(k), and the first measurement value $y_h$(k). In other words, posterior estimation is performed on the process status and the process covariance based on the Kalman feedback gain matrix K(k+1|k), the prior process covariance $\hat{P}$(k+1|k), the measurement estimated covariance $\hat{P}_y$(k), the prior process status $\hat{x}$(k+1|k), the measurement estimated value $\hat{y}_h$(k), and the first measurement value $y_h$(k), to obtain the posterior process status $\hat{x}$(k+1) and the posterior process covariance $\hat{P}$(k+1). Specifically, the posterior process covariance $\hat{P}$(k+1) and the posterior process status $\hat{x}$(k+1) respectively satisfy:

$$\hat{P}(k+1) = \hat{P}(k+1|k+1) = \hat{P}(k+1|k) - K(k+1|k) \times \hat{P}_y(k) \times K^T(k+1|k)$$

$$\hat{x}(k+1) = \hat{x}(k+1|k+1) = \hat{x}(k+1|k) + K(k+1|k) \times (y_h(k) - \hat{y}_h(k))$$

It should be noted that the posterior process covariance $\hat{P}$(k+1) is a process covariance at the moment k+1 that is obtained through prediction. The posterior process status $\hat{x}$(k+1) is a process status at the moment k+1 that is obtained through prediction.

S705: Determine a vehicle status parameter of a vehicle based on the posterior process status.

In an implementation, a vehicle status parameter $\hat{y}_g$(k+1) at the moment k+1 is determined based on the posterior process status $\hat{x}$(k+1). Specifically, the vehicle status parameter at the moment k+1 may be comprehensively estimated based on the posterior process status $\hat{x}$(k+1) and the control variable status u(k).

$$\hat{y}_g(k+1) = g(\hat{x}(k+1), u(k))$$

$\hat{y}_g$(k+1) represents the vehicle status parameter at the moment k+1. g represents an output function.

It should be noted that the posterior process covariance $\hat{P}$(k+1) and the posterior process status $\hat{x}$(k+1) may be used as inputs of a vehicle status parameter estimation at a moment k+2, that is, the posterior process covariance $\hat{P}$(k+1) may be used as a sampling value of a new process covariance, and the posterior process status $\hat{x}$(k+1) may be used as a sampling value of a new process status, to estimate a vehicle status at a next moment of a current moment. Alternatively, it is understood that in this embodiment of this application, a vehicle status parameter at a current moment may be estimated based on a vehicle status at a previous moment of the current moment. In other words, the foregoing steps S701 to S704 may be performed cyclically based on the new process status and the process covariance generated by the posterior estimation.

In this application, in a process of estimating the vehicle status parameter, the process covariance and the measurement covariance are adaptively adjusted based on the driving status data, and then an adjusted process covariance and measurement covariance are used for a vehicle status estimation, so that estimation precision of the vehicle status parameter can be improved. In addition, in this application, a result obtained by introducing another estimation method (for example, a kinematics-based status estimation, a neural network-based status estimation, and a vision-based status estimation) is used as the measurement value of the “virtual sensor”, the measurement value obtained through measurement of the real sensor and the calculated measurement covariance are extended, and the extended measurement value and measurement covariance are used for the vehicle status estimation. This can further improve the estimation precision of the vehicle status parameter, and help improve performance of a vehicle dynamics control algorithm.

Figure 8:
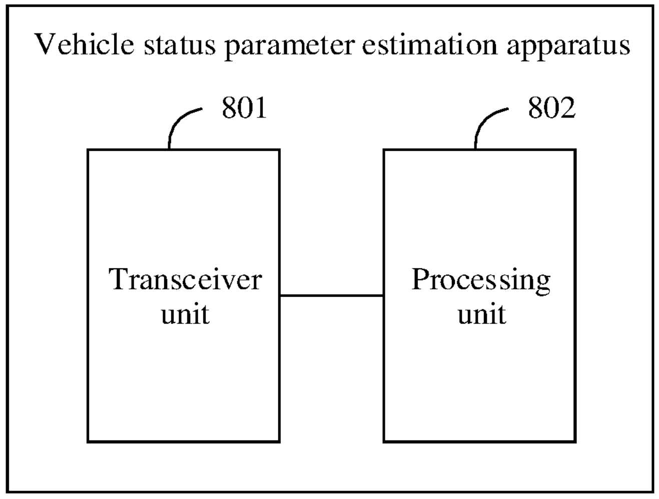
FIG. 8 is a schematic diagram of a structure of a vehicle status parameter estimation apparatus according to an embodiment of this application.
Figure 9:
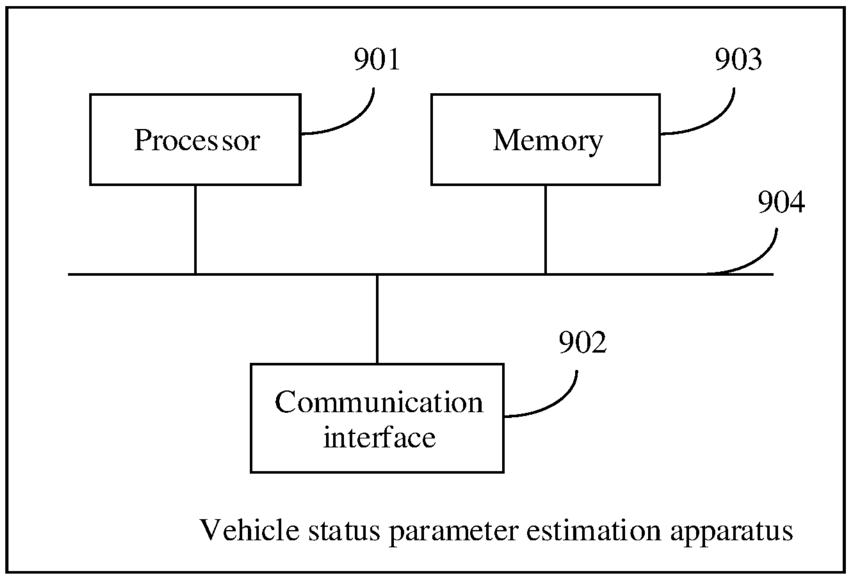
FIG. 9 is a schematic diagram of a structure of another vehicle status parameter estimation apparatus according to an embodiment of this application.
Figure 10:
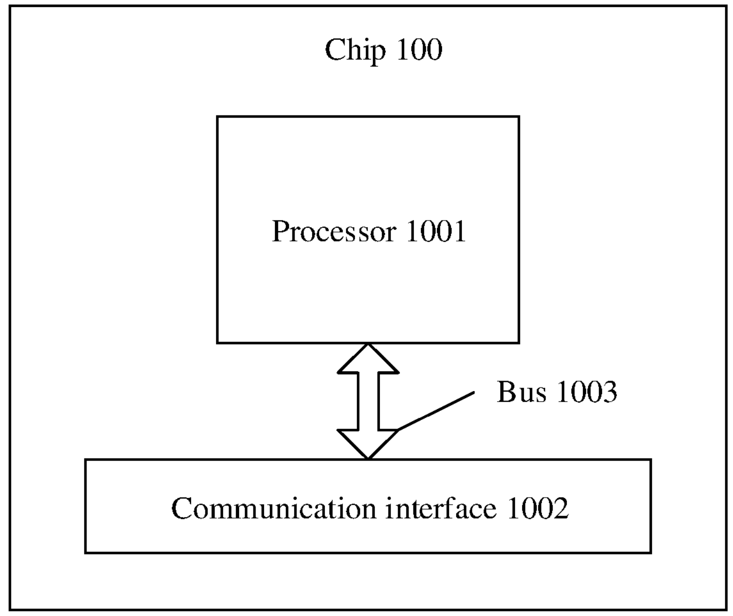
FIG. 10 is a schematic diagram of a structure of a chip according to an embodiment of this application.

The following describes in detail a vehicle status parameter estimation apparatus provided in this application with reference to FIG. 8 to FIG. 10.

FIG. 8 is a schematic diagram of a structure of a vehicle status parameter estimation apparatus according to an embodiment of this application. The vehicle status parameter estimation apparatus shown in FIG. 8 may be configured to perform some or all functions in the method embodiments described in FIG. 4 to FIG. 7. The apparatus may be a terminal, for example, may be an in-vehicle terminal, or may be an apparatus in a terminal, or may be an apparatus that can work together with a terminal. Alternatively, the vehicle status parameter estimation apparatus may be a chip system. The vehicle status parameter estimation apparatus shown in FIG. 8 may include a transceiver unit 801 and a processing unit 802. The processing unit 802 is configured to perform data processing. The transceiver unit 801 is integrated with a receiving unit and a sending unit. The transceiver unit 801 may also be referred to as a communication unit. Alternatively, the transceiver unit 801 may be split into a receiving unit and a sending unit. The processing unit 802 and the transceiver unit 801 below are similar to those described herein, and details are not described below again.

The transceiver unit 801 is configured to obtain driving status data of a vehicle, a first process status x, and a first process covariance Q.

The processing unit 802 is configured to determine a second process covariance Q(k) and a first measurement covariance R(k) based on the driving status data of the vehicle.

The transceiver unit 801 is configured to obtain a first measurement value $y_h$ of a vehicle sensor.

The processing unit 802 is configured to determine a vehicle status parameter of the vehicle based on the first measurement value $y_h$, the first process status x, the first process covariance Q, the second process covariance Q(k), and the first measurement covariance R(k).

In a possible implementation, the driving status data includes one or more of the following: a lateral acceleration change rate $\dot{r}V$, a steering wheel speed $\dot{\delta}$, a horizontal acceleration $a_y$, a road adhesion coefficient μ, a front left wheel speed $\omega_{FL}$, a front right wheel speed $\omega_{FR}$, a rear left wheel speed $\omega_{RL}$, or a rear right wheel speed $\omega_{RR}$.

In a possible implementation, the processing unit 802 is configured to:

when the road adhesion coefficient μ is greater than or equal to a first preset road adhesion coefficient threshold $\mu_{TH}$, and an absolute value $|\dot{r}V|$ of the lateral acceleration change rate is greater than a preset lateral acceleration change rate threshold $\dot{r}V_{TH}$ and/or an absolute value $|\dot{\delta}|$ of the steering wheel speed is greater than a preset steering wheel speed threshold $\dot{\delta}_{TH}$, obtain a first preset process covariance matrix as the second process covariance Q(k); or when the road adhesion coefficient μ is greater than or equal to the first preset road adhesion coefficient threshold $\mu_{TH}$, and the absolute value $|\dot{r}V|$ of the lateral acceleration change rate is less than or equal to the preset lateral acceleration change rate threshold $\dot{r}V_{TH}$ and the absolute value $|\dot{\delta}|$ of the steering wheel speed is less than or equal to the preset steering wheel speed threshold $\dot{\delta}_{TH}$, determine the second process covariance Q(k) based on the horizontal acceleration $a_y$; or when the road adhesion coefficient μ is less than the first preset road adhesion coefficient threshold $\mu_{TH}$, and the absolute value $|\dot{r}V|$ of the lateral acceleration change rate is greater than the preset lateral acceleration change rate threshold $\dot{r}V_{TH}$ and/or the absolute value $|\dot{\delta}|$ of the steering wheel speed is greater than the preset steering wheel speed threshold $\dot{\delta}_{TH}$, obtain a second preset process covariance matrix as the second process covariance Q(k); or when the road adhesion coefficient μ is less than the first preset road adhesion coefficient threshold $\mu_{TH}$, and the absolute value $|\dot{r}V|$ of the lateral acceleration change rate is less than or equal to the preset lateral acceleration change rate threshold $\dot{r}V_{TH}$ and the absolute value $|\dot{\delta}|$ of the steering wheel speed is less than or equal to the preset steering wheel speed threshold $\dot{\delta}_{TH}$, obtain a third preset process covariance matrix as the second process covariance Q(k).

In a possible implementation, the processing unit 802 is configured to:

when a maximum value $\max|\Delta\omega_i|$ of an absolute value of a wheel speed difference between different wheels is greater than a preset wheel speed difference threshold $\Delta\omega_{TH}$, and/or a minimum value $\min|\omega_i|$ of absolute values of wheel speeds of different wheels is less than a preset wheel speed threshold $\omega_{TH}$, obtain a first preset measurement covariance matrix as the first measurement covariance R(k); or when the maximum value $\max|\Delta\omega_i|$ of the absolute value of the wheel speed difference between the different wheels is less than or equal to the preset wheel speed difference threshold $\Delta\omega_{TH}$, and the minimum value $\min|\omega_i|$ of the absolute values of the wheel speeds of the different wheels is greater than or equal to the preset wheel speed threshold $\omega_{TH}$, determine the first measurement covariance R(k) based on the road adhesion coefficient μ.

In a possible implementation, the processing unit 802 is configured to:

when the road adhesion coefficient μ is greater than or equal to a second preset road adhesion coefficient threshold $$\mu'_{TH},$$

obtain a second preset measurement covariance matrix as the first measurement covariance R(k); or when the road adhesion coefficient μ is less than the second preset road adhesion coefficient threshold $$\mu'_{TH},$$

obtain a third preset measurement covariance matrix as the first measurement covariance R(k).

In a possible implementation, the first measurement value $y_h$ of the vehicle sensor includes a measurement value measured by a real vehicle sensor and a measurement value obtained based on a virtual vehicle sensor, and the measurement value of the virtual vehicle sensor is obtained by using a neural network.

In a possible implementation, the first process status x includes one or more of the following:

a longitudinal speed $v_x$, a horizontal speed $v_y$, a yaw angular velocity r, the front left wheel speed $\omega_{FL}$, the front right wheel speed $\omega_{FR}$, the rear left wheel speed $\omega_{RL}$, the rear right wheel speed $\omega_{RR}$, or the road adhesion coefficient μ.

In a possible implementation, the first measurement value $y_h$ includes one or more of the following:

a longitudinal acceleration $a_x$, the horizontal acceleration $a_y$, the yaw angular velocity r, the front left wheel speed $\omega_{FL}$, the front right wheel speed $\omega_{FR}$, the rear left wheel speed $\omega_{RL}$, the rear right wheel speed $\omega_{RR}$, or a centroid sideslip angle β.

In a possible implementation, the vehicle status parameter includes one or more of the following:

the longitudinal speed $v_x$, the horizontal speed $v_y$, the yaw angular velocity r, the front left wheel speed $\omega_{FL}$, the front right wheel speed $\omega_{FR}$, the rear left wheel speed $\omega_{RL}$, the rear right wheel speed $\omega_{RR}$, the road adhesion coefficient μ, the longitudinal acceleration $a_x$, the horizontal acceleration $a_y$, or the centroid sideslip angle β.

FIG. 9 is a schematic diagram of a structure of another vehicle status parameter estimation apparatus according to an embodiment of this application. As shown in FIG. 9, the vehicle status parameter estimation apparatus includes a processor 901, a communication interface 902, and a memory 903. The processor 901, the communication interface 902, and the memory 903 are coupled through a bus 904.

The processor 901 may be one or more central processing units (CPUs). When the processor 901 is one CPU, the CPU may be a single-core CPU or a multi-core CPU.

The processor 901 is configured to: read a program stored in the memory, and cooperate with the communication interface 902 to perform some or all steps of the method performed by the vehicle status parameter estimation apparatus in the foregoing embodiment of this application.

The memory 903 includes but is not limited to a random access memory (RAM), an erasable programmable read-only memory (EPROM), a read-only memory (ROM) or a compact disc read-only memory (CD-ROM), or the like. The memory 903 is configured to store a program, and the processor 901 may read the program stored in the memory 903. The steps in the methods shown in FIG. 4 to FIG. 7 in the foregoing embodiments of this application are performed. Details are not described herein again.

FIG. 10 is a schematic diagram of a structure of a chip according to an embodiment of this application. As shown in FIG. 10, the chip 100 may include a processor 1001, and one or more communication interfaces 1002 coupled to the processor 1001.

The processor 1001 may be configured to read and execute computer-readable instructions. In an exemplary implementation, the processor 1001 may mainly include a controller, an arithmetic unit, and a register. The controller is mainly responsible for instruction decoding, and sends a control signal for an operation corresponding to the instruction. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. In an exemplary implementation, a hardware architecture of the processor 1001 may be an application-specific integrated circuit (ASIC) architecture, a microprocessor without interlocked pipelined stages (MIPS) architecture, an advanced reduced instruction set computer (RISC) machines (ARM) architecture, a network processor (NP) architecture, or the like. The processor 1001 may have a single core or a plurality of cores.

The communication interface 1002 may be configured to input to-be-processed data to the processor 1001, and may output a processing result of the processor 1001. For example, the communication interface 1002 may be a general-purpose input/output (GPIO) interface, and may be connected to a plurality of peripheral devices (such as a liquid-crystal display (LCD), a camera, and a radio frequency (RF) module). The communication interface 1002 is connected to the processor 1001 through a bus 1003.

In this application, the processor 1001 may be configured to: invoke, from a memory: an implementation program of the vehicle status parameter estimation method provided in one or more embodiments of this application, and execute instructions included in the program. The communication interface 1002 may be configured to output an execution result of the processor 1001. In this application, the communication interface 1002 may be configured to output a vehicle status parameter estimation result of the processor 1001. For the vehicle status parameter estimation method provided in one or more embodiments of this application, refer to the embodiments shown in FIG. 4 to FIG. 7. Details are not described herein again.

It should be noted that functions corresponding to the processor 1001 and the communication interface 1002 may be implemented by using a hardware design, or may be implemented by using a software design, or may be implemented by a combination of hardware and software. This is not limited herein.

Based on a same concept, problem-resolving principles and beneficial effects of the vehicle status parameter estimation apparatus provided in embodiments of this application are similar to problem-resolving principles and beneficial effects of the vehicle status parameter estimation method in the method embodiments of this application. For details, refer to the implementation principles and beneficial effects of the method. For a relationship between steps performed by related modules, refer to description of related content in the foregoing embodiment. For brevity, details are not described herein again.

An embodiment of this application further provides a computer storage medium, which may be configured to store computer software instructions used by the vehicle status parameter estimation apparatus in the embodiments shown in FIG. 4 to FIG. 7. The computer software instructions include a program designed for the vehicle status parameter estimation apparatus in the foregoing embodiments. The storage medium includes but is not limited to a flash memory, a hard disk drive, or a solid-state drive.

An embodiment of this application further provides a computer program product. When the computer product is run by a vehicle status parameter estimation apparatus, the vehicle status parameter estimation method designed for the vehicle status parameter estimation apparatus in the embodiments shown in FIG. 4 to FIG. 7 may be performed.

An embodiment of this application further provides a sensor system, configured to provide a vehicle status parameter estimation function for a vehicle. The system includes at least one vehicle status parameter estimation apparatus mentioned in the foregoing embodiments of this application and at least one of a camera, a radar, and another sensor. At least one sensor apparatus in the system may be integrated into an overall unit or device, or at least one sensor apparatus in the system may be disposed as an independent element or apparatus.

An embodiment of this application further provides a system applied to self-driving or intelligent driving. The system includes at least one vehicle status parameter estimation apparatus mentioned in the foregoing embodiment of this application and at least one of other sensors such as a camera and a radar. At least one apparatus in the system may be integrated as an entire system or a device, or at least one apparatus in the system may be independently disposed as an element or an apparatus.

Further, any of the above systems may interact with a central controller of a vehicle to provide information such as a vehicle status parameter for decision or control of driving of the vehicle.

An embodiment of this application further provides a terminal. The terminal includes at least one vehicle status parameter estimation apparatus mentioned in the foregoing embodiments of this application or any one of the foregoing systems. For example, the terminal may include a vehicle, a camera, an uncrewed aerial vehicle, or the like. This is not limited herein.

It may be understood that sequence adjustment, combination, and deletion may be performed on the steps in the method embodiments of this application based on an actual requirement.

Modules in the apparatus embodiments of this application may be combined, divided, or deleted based on an actual requirement.

Persons of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The foregoing descriptions are merely exemplary implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A vehicle control method incorporating a vehicle status parameter estimation method, carried out by an apparatus comprising a transceiver and a processor, wherein the vehicle control method comprises:

obtaining, by the transceiver, driving status data of a vehicle, a first process status x, and a first process covariance Q;

determining, by the processor based on the driving status data of the vehicle, a second process covariance Q(k) and a first measurement covariance R(k);

obtaining, by the transceiver, a first measurement value $y_h$ of a vehicle sensor;

determining, by the processor, a vehicle status parameter of the vehicle based on the first measurement value $y_h$, the first process status x, the first process covariance Q, the second process covariance Q(k), and the first measurement covariance R(k), and operating, in accordance with the vehicle status parameter, at least one vehicle control system of the vehicle taken from the group consisting of: an electronic stability program (ESP), an antilock brake system (ABS), a traction control system (TCS), a self-driving system, and an intelligent driving system;

wherein the driving status data comprises one or more of the following:

a lateral acceleration change rate $\dot{r}V$, a steering wheel speed $\dot{\delta}$, a horizontal acceleration $a_y$, a road adhesion coefficient $\mu$, a front left wheel speed $\omega_{FL}$, a front right wheel speed $\omega_{FR}$, a rear left wheel speed $\omega_{RL}$, or a rear right wheel speed $\omega_{RR}$, wherein the determining, by the processor, the second process covariance Q(k) based on the driving status data of the vehicle comprises:

based on the road adhesion coefficient $\mu$ being greater than or equal to a first preset road adhesion coefficient threshold $\mu_{TH}$, and an absolute value $|\dot{r}V|$ of the lateral acceleration change rate being greater than a preset lateral acceleration change rate threshold $\dot{r}V_{TH}$ and/or an absolute value $|\dot{\delta}|$ of the steering wheel speed being greater than a preset steering wheel speed threshold $\dot{\delta}_{TH}$, obtaining, by the processor, a first preset process covariance matrix as the second process covariance Q(k); or based on the road adhesion coefficient $\mu$ being greater than or equal to the first preset road adhesion coefficient threshold $\mu_{TH}$, and the absolute value $|\dot{r}V|$ of the lateral acceleration change rate being less than or equal to the preset lateral acceleration change rate threshold $\dot{r}V_{TH}$ and the absolute value $|\dot{\delta}|$ of the steering wheel speed being less than or equal to the preset steering wheel speed threshold $\dot{\delta}_{TH}$, determining, by the processor, the second process covariance Q(k) based on the horizontal acceleration $a_y$; or based on the road adhesion coefficient $\mu$ being less than the first preset road adhesion coefficient threshold $\mu_{TH}$, and the absolute value $|\dot{r}V|$ of the lateral acceleration change rate being greater than the preset lateral acceleration change rate threshold $\dot{r}V_{TH}$ and/or the absolute value $|\dot{\delta}|$ of the steering wheel speed being greater than the preset steering wheel speed threshold $\dot{\delta}_{TH}$, obtaining, by the processor, a second preset process covariance matrix as the second process covariance Q(k); or based on the road adhesion coefficient $\mu$ being less than the first preset road adhesion coefficient threshold $\mu_{TH}$, and the absolute value $|\dot{r}V|$ of the lateral acceleration change rate being less than or equal to the preset lateral acceleration change rate threshold $\bar{r}V_{TH}$ and the absolute value $|\dot{\delta}|$ of the steering wheel speed being less than or equal to the preset steering wheel speed threshold $\dot{\delta}_{TH}$, obtaining, by the processor, a third preset process covariance matrix as the second process covariance Q(k).

2. The method according to claim 1, wherein the determining, by the processor, the first measurement covariance R(k) based on the driving status data of the vehicle comprises:

based on a maximum value $\max|\Delta\omega_i|$ of an absolute value of a wheel speed difference between different wheels being greater than a preset wheel speed difference threshold $\Delta\omega_{TH}$, and/or a minimum value $\min|\omega_i|$ of absolute values of wheel speeds of different wheels being less than a preset wheel speed threshold $\omega_{TH}$, obtaining, by the processor, a first preset measurement covariance matrix as the first measurement covariance R(k); or based on the maximum value $\max|\Delta\omega_i|$ of the absolute value of the wheel speed difference between the different wheels being less than or equal to the preset wheel speed difference threshold $\Delta\omega_{TH}$, and the minimum value $\min|\omega_i|$ of the absolute values of the wheel speeds of different wheels being greater than or equal to the preset wheel speed threshold $\omega_{TH}$, determining, by the processor, the first measurement covariance R(k) based on the road adhesion coefficient μ.

3. The method according to claim 2, wherein the determining, by the processor, the first measurement covariance R(k) based on the road adhesion coefficient μ comprises:

based on the road adhesion coefficient μ being greater than or equal to a second preset road adhesion coefficient threshold $$\mu'_{TH},$$

obtaining, by the processor, a second preset measurement covariance matrix as the first measurement covariance R(k); or based on the road adhesion coefficient μ being less than the second preset road adhesion coefficient threshold $$\mu'_{TH},$$

obtaining, by the processor, a third preset measurement covariance matrix as the first measurement covariance R(k).

4. The method according to claim 1, wherein the first measurement value $y_h$ of the vehicle sensor comprises a measurement value measured by a real vehicle sensor and a measurement value obtained based on a virtual vehicle sensor, and wherein the measurement value of the virtual vehicle sensor is obtained by using a neural network.

5. The method according to claim 1, wherein the first process status x comprising one or more of the following:

a longitudinal speed $v_x$, a horizontal speed $v_y$, a yaw angular velocity r, a front left wheel speed $\omega_{FL}$, a front right wheel speed $\omega_{FR}$, a rear left wheel speed $\omega_{RL}$, a rear right wheel speed $\omega_{RR}$, or a road adhesion coefficient μ.

6. The method according to claim 1, wherein the first measurement value $y_h$ comprises one or more of the following:

a longitudinal acceleration $a_x$, a horizontal acceleration $a_y$, a yaw angular velocity r, a front left wheel speed $\omega_{FL}$, a front right wheel speed $\omega_{FR}$, a rear left wheel speed $\omega_{RL}$, a rear right wheel speed $\omega_{RR}$, or a centroid sideslip angle β.

7. The method according to claim 1, wherein the vehicle status parameter comprises one or more of the following:

a longitudinal speed $v_x$, a horizontal speed $v_y$, a yaw angular velocity r, a front left wheel speed $\omega_{FL}$, a front right wheel speed $\omega_{FR}$, a rear left wheel speed RL, a rear right wheel speed $\omega_{RR}$, a road adhesion coefficient μ, a longitudinal acceleration $a_x$, a horizontal acceleration $a_y$, or a centroid sideslip angle β.

8. A vehicle including at least one vehicle control system and a vehicle status parameter estimation apparatus comprising:

a transceiver, and a processor, wherein the transceiver is configured to obtain driving status data of a vehicle, a first process status x, and a first process covariance Q;

wherein the processor is configured to determine, based on the driving status data of the vehicle, a second process covariance Q(k) and a first measurement covariance R(k), wherein the transceiver is configured to obtain a first measurement value $y_h$ of a vehicle sensor;

wherein the processor is configured to determine a vehicle status parameter of the vehicle based on the first measurement value $y_h$, the first process status x, the first process covariance Q, the second process covariance Q(k), and the first measurement covariance R(k), and wherein the at least one vehicle system is configured to operate in accordance with the vehicle status parameter, wherein the at least one vehicle control system of the vehicle is taken from the group consisting of: an electronic stability program (ESP), an antilock brake system (ABS), a traction control system (TCS), a self-driving system, and an intelligent driving system;

wherein the driving status data comprises one or more of the following:

a lateral acceleration change rate $\dot{r}V$, a steering wheel speed $\dot{\delta}$, a horizontal acceleration $a_y$, a road adhesion coefficient μ, a front left wheel speed $\omega_{FL}$, a front right wheel speed $\omega_{FR}$, a rear left wheel speed $\omega_{RL}$, or a rear right wheel speed $\omega_{RR}$, wherein the processor configured to determine the second process covariance Q(k) based on the driving status data of the vehicle by:

based on the road adhesion coefficient μ being greater than or equal to a first preset road adhesion coefficient threshold $\mu_{TH}$, and an absolute value $|\dot{r}V|$ of the lateral acceleration change rate being greater than a preset lateral acceleration change rate threshold $\dot{r}V_{TH}$ and/or an absolute value $|\dot{\delta}|$ of the steering wheel speed being greater than a preset steering wheel speed threshold $\dot{\delta}_{TH}$, obtaining a first preset process covariance matrix as the second process covariance Q(k); or based on the road adhesion coefficient μ being greater than or equal to the first preset road adhesion coefficient threshold $\mu_{TH}$, and the absolute value $|\dot{r}V|$ of the lateral acceleration change rate being less than or equal to the preset lateral acceleration change rate threshold $\dot{r}V_{TH}$ and the absolute value $|\dot{\delta}|$ of the steering wheel speed being less than or equal to the preset steering wheel speed threshold $\dot{\delta}_{TH}$, determining the second process covariance Q(k) based on the horizontal acceleration $a_y$; or based on the road adhesion coefficient μ being less than the first preset road adhesion coefficient threshold $\mu_{TH}$, and the absolute value $|\dot{r}V|$ of the lateral acceleration change rate being greater than the preset lateral acceleration change rate threshold $\dot{r}V_{TH}$ and/or the absolute value $|\dot{\delta}|$ of the steering wheel speed being greater than the preset steering wheel speed threshold $\dot{\delta}_{TH}$, obtaining a second preset process covariance matrix as the second process covariance Q(k); or based on the road adhesion coefficient $\mu$ being less than the first preset road adhesion coefficient threshold $\mu_{TH}$, and the absolute value $|\dot{r}V|$ of the lateral acceleration change rate being less than or equal to the preset lateral acceleration change rate threshold $\dot{r}V_{TH}$ and the absolute value $|\dot{\delta}|$ of the steering wheel speed being less than or equal to the preset steering wheel speed threshold $\dot{\delta}_{TH}$, obtaining a third preset process covariance matrix as the second process covariance Q(k).

9. The vehicle according to claim 8, wherein the processor is configured to:

based on a maximum value $\max|\Delta\omega_i|$ of an absolute value of a wheel speed difference between different wheels being greater than a preset wheel speed difference threshold $\Delta\omega_{TH}$, and/or a minimum value $\min|\omega_i|$ of absolute values of wheel speeds of different wheels being less than a preset wheel speed threshold $\omega_{TH}$, obtain a first preset measurement covariance matrix as the first measurement covariance R(k); or based on the maximum value $\max|\Delta\omega_i|$ of the absolute value of the wheel speed difference between the different wheels being less than or equal to the preset wheel speed difference threshold $\Delta\omega_{TH}$, and the minimum value $\min|\omega_i|$ of the absolute values of the wheel speeds of the different wheels being greater than or equal to the preset wheel speed threshold $\omega_{TH}$, determine the first measurement covariance R(k) based on the road adhesion coefficient $\mu$.

10. The vehicle according to claim 9, wherein the processor is configured to:

based on the road adhesion coefficient $\mu$ being greater than or equal to a second preset road adhesion coefficient threshold $$\mu'_{TH},$$

obtain a second preset measurement covariance matrix as the first measurement covariance R(k); or based on the road adhesion coefficient $\mu$ being less than the second preset road adhesion coefficient threshold $$\mu'_{TH},$$

obtain a third preset measurement covariance matrix as the first measurement covariance R(k).

11. The vehicle according to claim 8, wherein the first measurement value $y_h$ of the vehicle sensor comprises a measurement value measured by a real vehicle sensor and a measurement value obtained based on a virtual vehicle sensor, and wherein the measurement value of the virtual vehicle sensor is obtained by using a neural network.

12. The vehicle according to claim 8, wherein the first process status x comprises one or more of the following:

a longitudinal speed $v_x$, a horizontal speed $v_y$, a yaw angular velocity r, a front left wheel speed $\omega_{FL}$, a front right wheel speed $\omega_{FR}$, a rear left wheel speed $\omega_{RL}$, a rear right wheel speed $\omega_{RR}$, or a road adhesion coefficient $\mu$.

13. The vehicle according to claim 8, wherein the first measurement value $y_h$ comprises one or more of the following:

a longitudinal acceleration $a_x$, a horizontal acceleration $a_y$, a yaw angular velocity r, a front left wheel speed $\omega_{FL}$, a front right wheel speed $\omega_{FR}$, a rear left wheel speed $\omega_{RL}$, a rear right wheel speed $\omega_{RR}$, or a centroid sideslip angle $\beta$.

14. The vehicle according to claim 8, wherein the vehicle status parameter comprises one or more of the following:

a longitudinal speed $v_x$, a horizontal speed $v_y$, a yaw angular velocity r, a front left wheel speed $\omega_{FL}$, a front right wheel speed $\omega_{FR}$, a rear left wheel speed $\omega_{RL}$, a rear right wheel speed $\omega_{RR}$, a road adhesion coefficient $\mu$, a longitudinal acceleration $a_x$, a horizontal acceleration $a_y$, or a centroid sideslip angle $\beta$.

15. A non-transitory computer-readable storage medium, wherein the computer-readable storage medium stores a computer program, and when the computer program is run on a computer, the computer is caused to perform a vehicle control method comprising:

obtaining driving status data of a vehicle, a first process status x, and a first process covariance Q;

determining, based on the driving status data of the vehicle, a second process covariance Q(k) and a first measurement covariance R(k);

obtaining a first measurement value $y_h$ of a vehicle sensor;

determining a vehicle status parameter of the vehicle based on the first measurement value $y_h$, the first process status x, the first process covariance Q, the second process covariance Q(k), and the first measurement covariance R(k), and operating, in accordance with the vehicle status parameter, at least one vehicle control system of the vehicle taken from the group consisting of: an electronic stability program (ESP), an antilock brake system (ABS), a traction control system (TCS), a self-driving system, and an intelligent driving system;

wherein the driving status data comprises one or more of the following:

a lateral acceleration change rate $\dot{r}V$,
a steering wheel speed $\dot{\delta}$,
a horizontal acceleration $a_y$,
a road adhesion coefficient $\mu$,
a front left wheel speed $\omega_{FL}$,
a front right wheel speed $\omega_{FR}$,
a rear left wheel speed $\omega_{RL}$, or
a rear right wheel speed $\omega_{RR}$, wherein the determining, by the processor, the second process covariance Q(k) based on the driving status data of the vehicle comprises:

based on the road adhesion coefficient $\mu$ being greater than or equal to a first preset road adhesion coefficient threshold $\mu_{TH}$, and an absolute value $|\dot{r}V|$ of the lateral acceleration change rate being greater than a preset lateral acceleration change rate threshold $\dot{r}V_{TH}$ and/or an absolute value $|\dot{\delta}|$ of the steering wheel speed being greater than a preset steering wheel speed threshold $\dot{\delta}_{TH}$, obtaining, by the processor, a first preset process covariance matrix as the second process covariance Q(k); or based on the road adhesion coefficient $\mu$ being greater than or equal to the first preset road adhesion coefficient threshold $\mu_{TH}$, and the absolute value $|\dot{r}V|$ of the lateral acceleration change rate being less than or equal to the preset lateral acceleration change rate threshold $\dot{r}V_{TH}$ and the absolute value $|\dot{\delta}|$ of the steering wheel speed being less than or equal to the preset steering wheel speed threshold $\dot{\delta}_{TH}$, determining, by the processor, the second process covariance Q(k) based on the horizontal acceleration $a_y$; or based on the road adhesion coefficient μ being less than the first preset road adhesion coefficient threshold $\mu_{TH}$, and the absolute value $|\dot{r}V|$ of the lateral acceleration change rate being greater than the preset lateral acceleration change rate threshold $\dot{r}V_{TH}$ and/or the absolute value $|\dot{\delta}|$ of the steering wheel speed being greater than the preset steering wheel speed threshold $\dot{\delta}_{TH}$, obtaining, by the processor, a second preset process covariance matrix as the second process covariance Q(k); or based on the road adhesion coefficient μ being less than the first preset road adhesion coefficient threshold $\mu_{TH}$, and the absolute value $|\dot{r}V|$ of the lateral acceleration change rate being less than or equal to the preset lateral acceleration change rate threshold $\dot{r}V_{TH}$ and the absolute value $|\dot{\delta}|$ of the steering wheel speed being less than or equal to the preset steering wheel speed threshold $\dot{\delta}_{TH}$, obtaining, by the processor, a third preset process covariance matrix as the second process covariance Q(k).

16. The non-transitory computer-readable storage medium according to claim 15, wherein the determining, by the processor, the first measurement covariance R(k) based on the driving status data of the vehicle comprises:

based on a maximum value $\max|\Delta\omega_i|$ of an absolute value of a wheel speed difference between different wheels being greater than a preset wheel speed difference threshold $\Delta\omega_{TH}$, and/or a minimum value $\min|\omega_i|$ of absolute values of wheel speeds of different wheels being less than a preset wheel speed threshold $\omega_{TH}$, obtaining, by the processor, a first preset measurement covariance matrix as the first measurement covariance R(k); or based on the maximum value $\max|\Delta\omega_i|$ of the absolute value of the wheel speed difference between the different wheels being less than or equal to the preset wheel speed difference threshold $\Delta\omega_{TH}$, and the minimum value $\min|\omega_i|$ of the absolute values of the wheel speeds of different wheels being greater than or equal to the preset wheel speed threshold $\omega_{TH}$, determining, by the processor, the first measurement covariance R(k) based on the road adhesion coefficient μ.

17. The non-transitory computer-readable storage medium according to claim 16, wherein the determining, by the processor, the first measurement covariance R(k) based on the road adhesion coefficient μ comprises:

based on the road adhesion coefficient μ being greater than or equal to a second preset road adhesion coefficient threshold $$\mu'_{TH},$$

obtaining, by the processor, a second preset measurement covariance matrix as the first measurement covariance R(k); or based on the road adhesion coefficient μ being less than the second preset road adhesion coefficient threshold $$\mu'_{TH},$$

obtaining, by the processor, a third preset measurement covariance matrix as the first measurement covariance R(k).

18. The non-transitory computer-readable storage medium according to claim 15, wherein the first measurement value $y_h$ of the vehicle sensor comprises a measurement value measured by a real vehicle sensor and a measurement value obtained based on a virtual vehicle sensor, and wherein the measurement value of the virtual vehicle sensor is obtained by using a neural network.

19. The non-transitory computer-readable storage medium according to claim 15, wherein the first process status x comprising one or more of the following:

a longitudinal speed $v_x$, a horizontal speed $v_y$, a yaw angular velocity r, a front left wheel speed $\omega_{FL}$, a front right wheel speed $\omega_{FR}$, a rear left wheel speed $\omega_{RL}$, a rear right wheel speed $\omega_{RR}$, or a road adhesion coefficient μ.

20. The non-transitory computer-readable storage medium according to claim 15, wherein the first measurement value $y_h$ comprises one or more of the following:

a longitudinal acceleration $a_x$, a horizontal acceleration $a_y$, a yaw angular velocity r, a front left wheel speed $\omega_{FL}$, a front right wheel speed $\omega_{FR}$, a rear left wheel speed $\omega_{RL}$, a rear right wheel speed $\omega_{RR}$, or a centroid sideslip angle β.

21. The non-transitory computer-readable storage medium according to claim 15, wherein the vehicle status parameter comprises one or more of the following:

a longitudinal speed $v_x$, a horizontal speed $v_y$, a yaw angular velocity r, a front left wheel speed $\omega_{FL}$, a front right wheel speed $\omega_{FR}$, a rear left wheel speed $\omega_{RL}$, a rear right wheel speed $\omega_{RR}$, a road adhesion coefficient μ, a longitudinal acceleration $a_x$, a horizontal acceleration $a_y$, or a centroid sideslip angle β.

* * * * *